(12) United States Patent
Zuckerman et al.

(10) Patent No.: US 11,046,230 B2
(45) Date of Patent: Jun. 29, 2021

(54) SYSTEMS AND METHODS FOR AUTONOMOUSLY ALTERING SHAPE AND FUNCTIONALITY OF ON-ROAD VEHICLES

(71) Applicants: Gal Zuckerman, Holon (IL); Moshe Salhov, Herzeliya (IL)

(72) Inventors: Gal Zuckerman, Holon (IL); Moshe Salhov, Herzeliya (IL)

( * ) Notice: Subject to any disclaimer, the term of this patent is extended or adjusted under 35 U.S.C. 154(b) by 0 days.

(21) Appl. No.: 16/502,834

(22) Filed: Jul. 3, 2019

(65) Prior Publication Data

US 2019/0322204 A1    Oct. 24, 2019

Related U.S. Application Data

(63) Continuation-in-part of application No. 15/898,473, filed on Feb. 17, 2018, now Pat. No. 10,384,871.

(60) Provisional application No. 62/473,436, filed on Mar. 19, 2017.

(51) Int. Cl.

| | |
|---|---|
| *B60P 1/64* | (2006.01) |
| *G05D 1/02* | (2020.01) |
| *B60P 1/02* | (2006.01) |
| *B60G 17/00* | (2006.01) |
| *G05D 1/00* | (2006.01) |
| *B60P 3/00* | (2006.01) |
| *B60P 3/025* | (2006.01) |
| *B60L 53/53* | (2019.01) |
| *B60L 53/54* | (2019.01) |
| *B60P 3/22* | (2006.01) |

(52) U.S. Cl.
CPC .......... *B60P 1/6445* (2013.01); *B60G 17/00* (2013.01); *B60P 1/02* (2013.01); *G05D 1/0088* (2013.01); *G05D 1/021* (2013.01); *G05D 1/0291* (2013.01); *B60L 53/53* (2019.02); *B60L 53/54* (2019.02); *B60P 3/007* (2013.01); *B60P 3/0257* (2013.01); *B60P 3/22* (2013.01); *G05D 2201/0212* (2013.01); *G05D 2201/0213* (2013.01)

(58) Field of Classification Search
CPC .... B65G 1/065; B60P 7/06; B60P 7/08; B60P 7/0807; B60P 7/13; B60P 3/00; B60P 1/02
See application file for complete search history.

(56) References Cited

U.S. PATENT DOCUMENTS

| | | | | |
|---|---|---|---|---|
| 3,197,229 A | * | 7/1965 | Houlton ................ | B66C 19/005 180/414 |
| 3,688,931 A | * | 9/1972 | Hans Tax .............. | B66C 19/007 414/460 |
| 4,087,013 A | * | 5/1978 | Wiley, Jr. ............. | B60P 1/6445 254/108 |

(Continued)

*Primary Examiner* — Erez Gurari
(74) *Attorney, Agent, or Firm* — Active Knowledge Ltd.

(57) ABSTRACT

Methods and systems for autonomously altering shape and functionality of on-road vehicles. An on-road autonomous vehicle, which is currently integrated with a first object and thus having a respective certain functional shape, performs a respective certain function. A request is obtained to alter functionality of the on-road vehicle, which consequently releases autonomously the first object, self drives to a location of a second object, and self-integrates with the second object by straddling-over and grabbing the second object, thus switching to a different functional shape and consequently accomplishing said alteration of functionality.

13 Claims, 24 Drawing Sheets

(56) References Cited

U.S. PATENT DOCUMENTS

| | | | | |
|---|---|---|---|---|
| 4,279,347 A * | 7/1981 | Appleman | B66C 19/007 | 212/274 |
| 4,381,839 A * | 5/1983 | Engler | B66C 19/02 | 212/314 |
| 4,500,248 A * | 2/1985 | Kramer | B60P 1/6445 | 414/351 |
| 4,551,059 A * | 11/1985 | Petoia | B66C 19/005 | 414/459 |
| 4,599,030 A * | 7/1986 | Skaalen | B62D 7/1509 | 180/236 |
| 5,735,416 A * | 4/1998 | Jussila | B66C 9/14 | 212/344 |
| 5,839,874 A * | 11/1998 | Johnston | B66C 19/005 | 414/459 |
| 5,967,348 A * | 10/1999 | Jussila | B62D 7/09 | 212/344 |
| 6,071,062 A * | 6/2000 | Warhurst | B60P 1/6445 | 414/347 |
| 6,155,770 A * | 12/2000 | Warhurst | B60P 1/6445 | 414/347 |
| 6,286,696 B1 * | 9/2001 | Van Gorp | B66C 13/00 | 212/343 |
| 6,345,724 B1 * | 2/2002 | Masumoto | B66C 11/20 | 212/173 |
| 6,539,877 B1 * | 4/2003 | Saunders | B61B 13/00 | 104/242 |
| D538,002 S * | 3/2007 | Kuhn | D34/28 | |
| 7,195,250 B2 * | 3/2007 | Knox | B60G 17/0165 | 280/5.518 |
| 7,547,177 B2 * | 6/2009 | Waisanen | B66C 1/62 | 414/459 |
| 7,779,761 B2 * | 8/2010 | Barry | B61K 1/00 | 105/355 |
| 7,811,044 B2 * | 10/2010 | Warhurst | B66C 19/007 | 414/458 |
| 7,866,933 B2 * | 1/2011 | Welch | B60P 1/6445 | 414/458 |
| 8,312,817 B2 * | 11/2012 | Barry | B60P 3/34 | 105/355 |
| 8,544,163 B2 * | 10/2013 | Sarh | B25J 9/0084 | 29/525.06 |
| 9,010,253 B2 * | 4/2015 | Barry | B60P 3/34 | 105/215.2 |
| 9,256,852 B1 * | 2/2016 | Myllymaki | B60P 3/007 | |
| 9,592,998 B2 * | 3/2017 | Pilgrim | B66C 19/005 | |
| 9,701,518 B2 * | 7/2017 | Rosenstrom | B66C 19/005 | |
| 9,891,629 B2 * | 2/2018 | Murray | A01B 79/00 | |
| 2002/0001515 A1 * | 1/2002 | Lukumaa | B66C 19/007 | 414/460 |
| 2003/0116373 A1 * | 6/2003 | Miller | B60T 7/22 | 180/167 |
| 2004/0016581 A1 * | 1/2004 | Watanabe | B66F 9/063 | 180/168 |
| 2005/0047895 A1 * | 3/2005 | Lert, Jr. | B65G 1/1378 | 414/273 |
| 2012/0321423 A1 * | 12/2012 | MacKnight | H01L 21/67724 | 414/664 |
| 2013/0017047 A1 * | 1/2013 | Holland | B60P 1/02 | 414/495 |
| 2014/0017051 A1 * | 1/2014 | Coogan | B66C 1/66 | 414/618 |
| 2014/0060949 A1 * | 3/2014 | Anderson | G01S 5/14 | 180/167 |
| 2015/0105965 A1 * | 4/2015 | Blackwell | A01B 69/008 | 701/28 |
| 2015/0125244 A1 * | 5/2015 | Coogan | B60P 3/00 | 414/399 |
| 2017/0015531 A1 * | 1/2017 | Schults | B66C 19/007 | |
| 2018/0237086 A1 * | 8/2018 | Evans | B62D 31/025 | |
| 2018/0265293 A1 * | 9/2018 | Zuckerman | B65G 1/137 | |

* cited by examiner

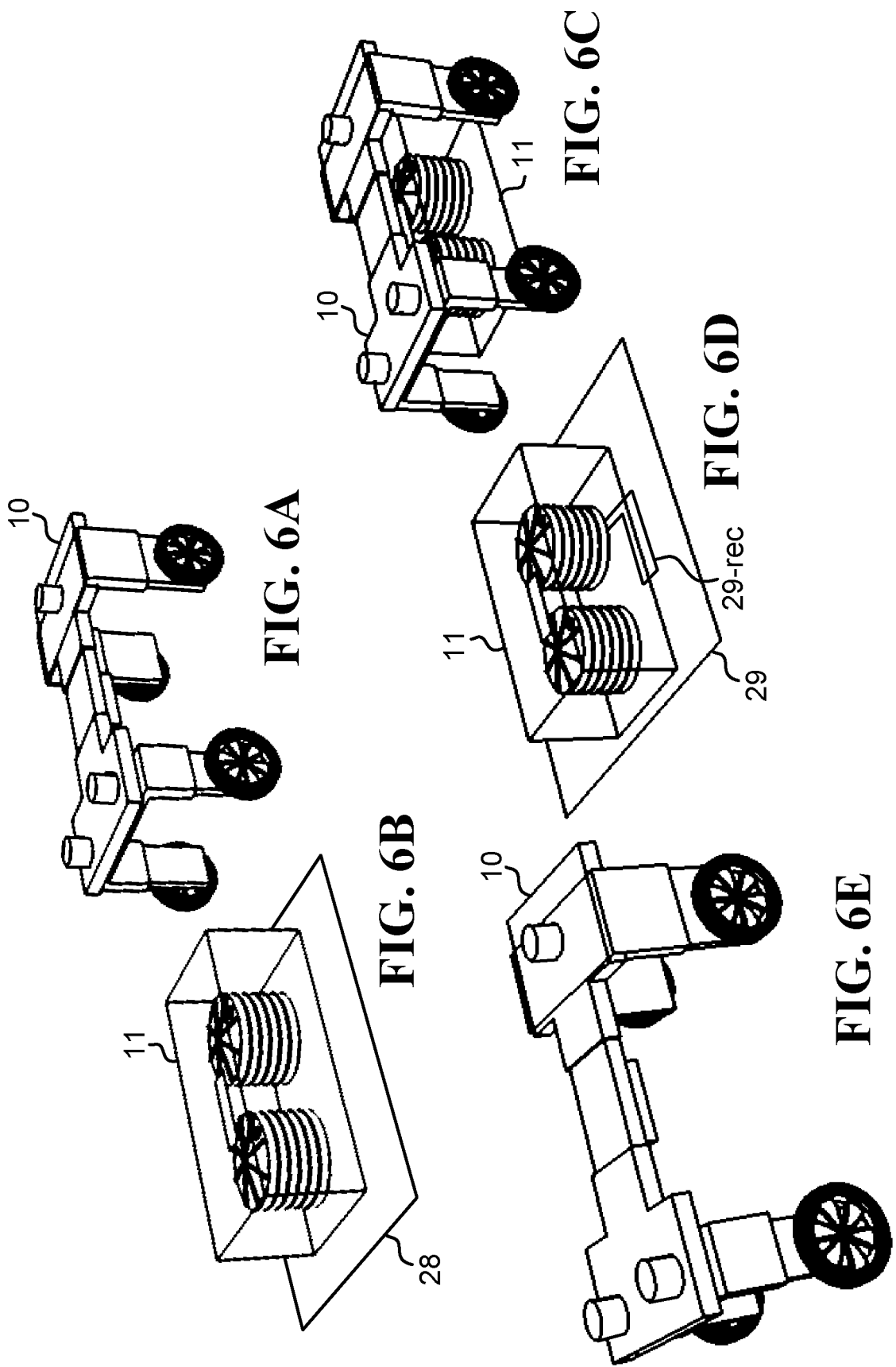

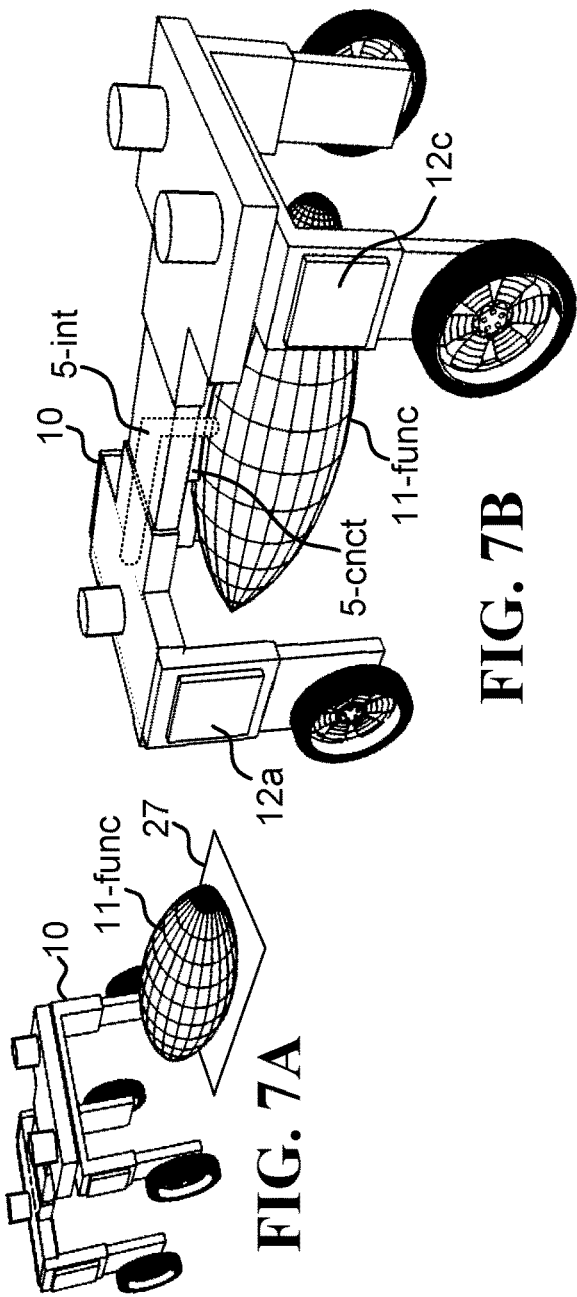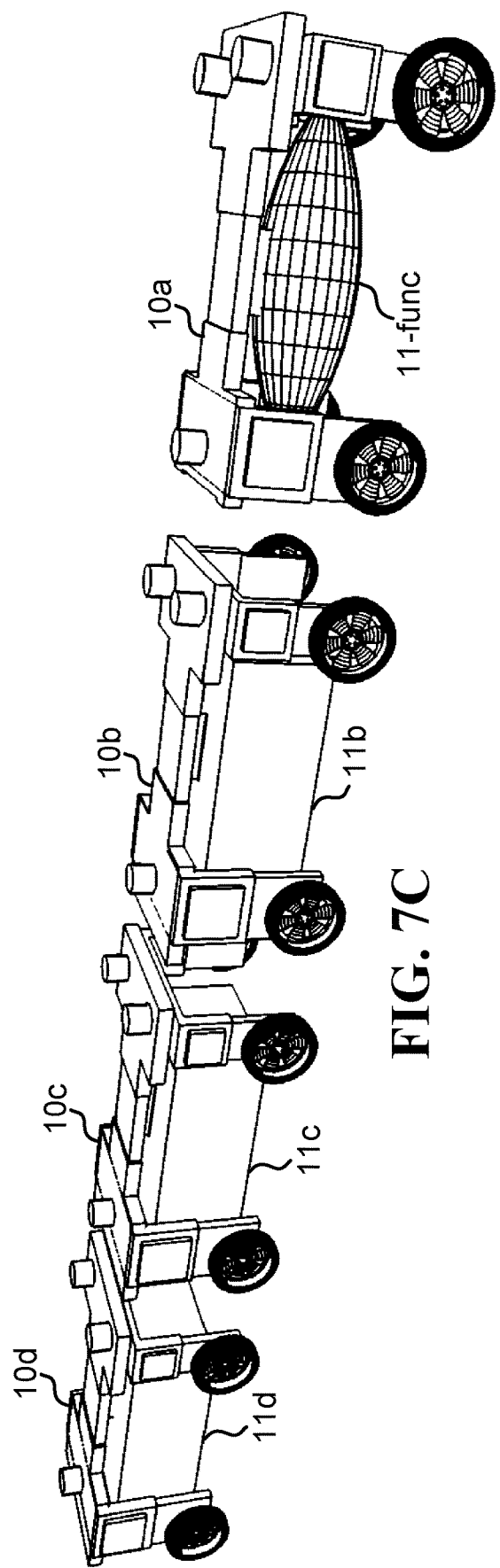

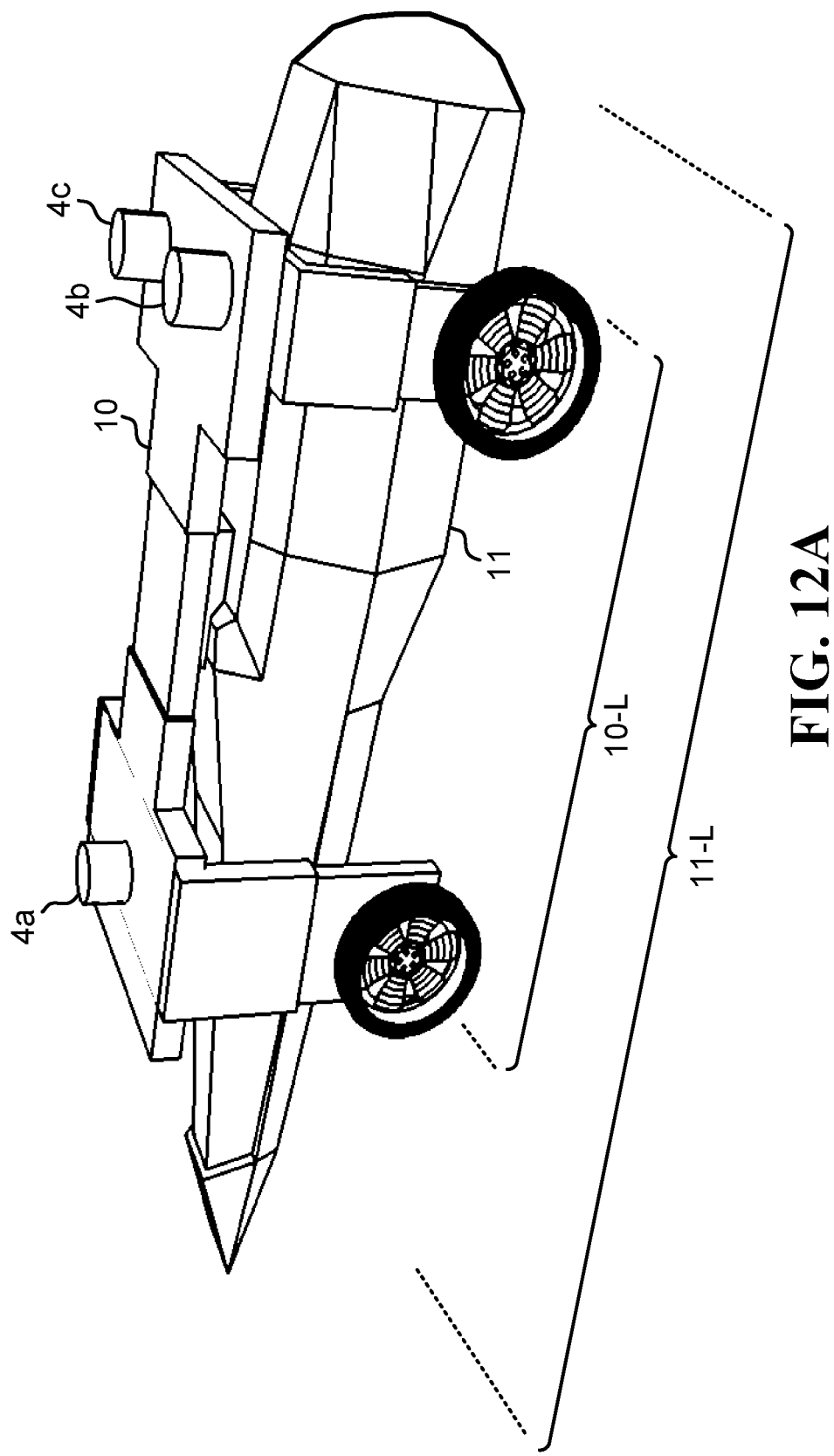

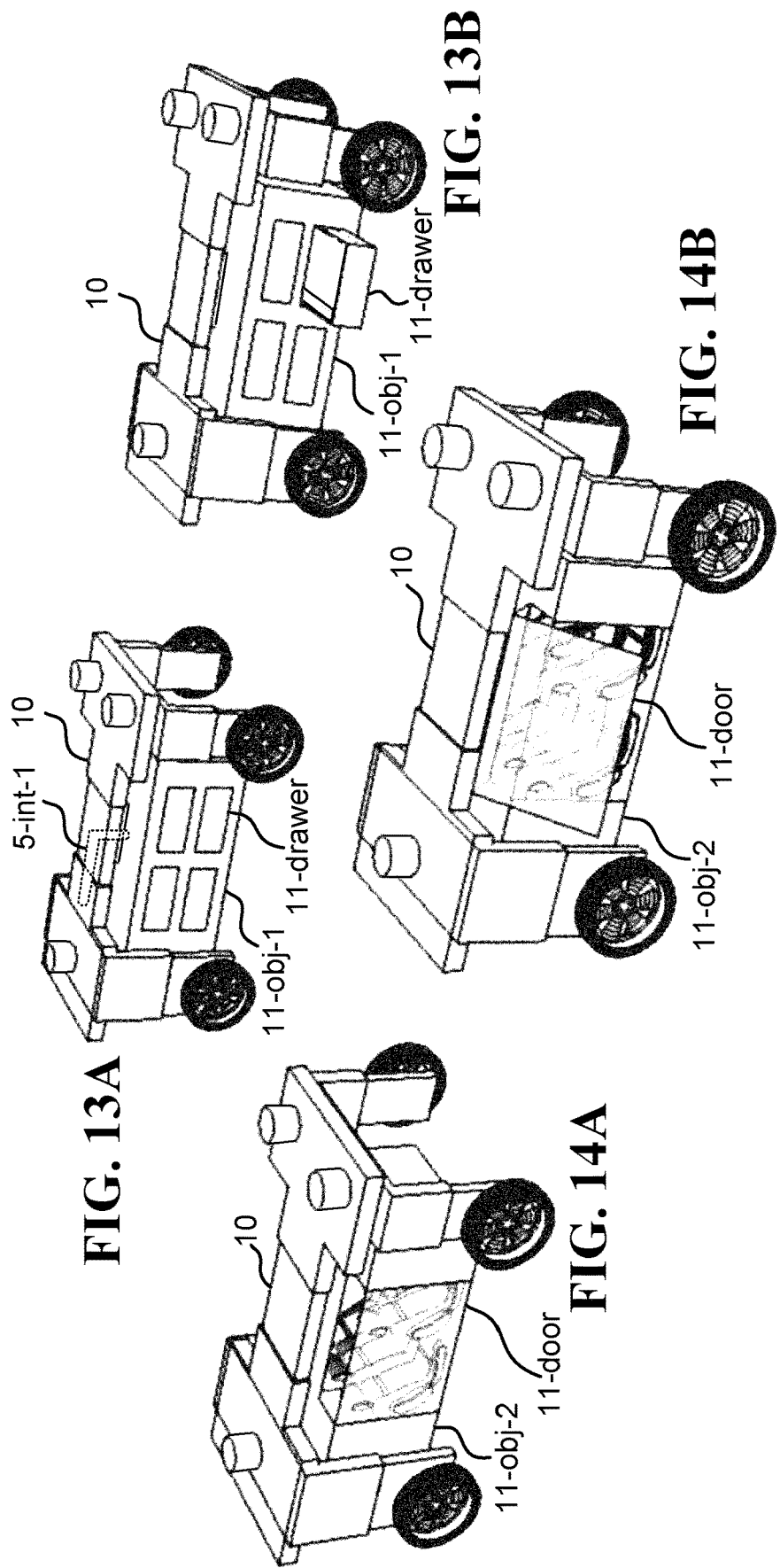

SYSTEMS AND METHODS FOR AUTONOMOUSLY ALTERING SHAPE AND FUNCTIONALITY OF ON-ROAD VEHICLES

CROSS REFERENCE TO RELATED APPLICATIONS

This Application is a continuation-in-part of patent application Ser. No. 15/898,473, filed on Feb. 17, 2018, which claims priority to U.S. Provisional Patent Application No. 62/473,436, filed on Mar. 19, 2017.

BACKGROUND

Current designs of on-road vehicles are ineffective in performing autonomously several different types of tasks. For example, an on-road vehicle designed to carry passengers autonomously is less suited for delivering packages autonomously and vice versa. Methods and system for increasing versatility of on-road autonomous vehicles are required.

SUMMARY

One embodiment is a system (FIG. 13A, FIG. 13B, FIG. 14A, FIG. 14B) operative to autonomously alter functionality of an on-road vehicle. The system includes: an on-road vehicle operative to straddle over objects; a first object operative to facilitate a first function when integrated with the on-road vehicle, in which the first object is currently integrated with the on-road vehicle, thereby currently enabling the on-road vehicle together with the first object to perform said first function; and a second object operative to facilitate a second function when integrated with the on-road vehicle, in which the second object is currently located at a certain location. In one embodiment, as a response to a specific request received in the system, the system is configured to autonomously alter functionality of the on-road vehicle from a first functionality associated with the first function into a different functionality associated with the second function, in which as a part of said autonomous alteration and said response, the on-road vehicle is configured to: release autonomously the first object; self drive from a current location of the on-road vehicle to said certain location of the second object; upon arrival to said certain location: straddle autonomously over the second object, thereby allowing the on-road vehicle to grab and lift autonomously the second object above ground, thereby integrating autonomously the second object with the on-road vehicle; and perform said second function in conjunction with the second object now integrated with the on-road vehicle.

One embodiment is a method (FIG. 15) for autonomously altering functionality of an on-road vehicle. The method includes: performing a first function by an on-road vehicle, in which the first function is performed by the on-road vehicle in conjunction with a first object that is currently integrated with the on-road-vehicle and that is operative to facilitate said first function; receiving, in conjunction with the on-road vehicle, a request associated with altering functionality of the on-road vehicle from a first functionality associated with the first function into a different functionality associated with a second function; releasing autonomously the first object by the on-road vehicle as a response to said request; self driving by the on-road vehicle, as a further response to said request, from a current location of the on-road vehicle to a certain location at which a second object is located, in which the second object is associated with said different functionality; upon arrival to said certain location: (i) straddling autonomously, by the on-road vehicle, over the second object, (ii) grabbing and lifting, autonomously, the second object above ground by the on-road vehicle, and thereby autonomously integrating the second object with the on-road vehicle; and performing said second function by the on-road vehicle in conjunction with the second object now integrated with the on-road vehicle.

One embodiment is a system (FIG. 13A, FIG. 13B, FIG. 14A, FIG. 14B) operative to respond to a dynamic demand for various functions by autonomously altering shape and functionality of on-road vehicles. The system includes: a fleet of on-road vehicles comprising a plurality of on-road vehicles, in which each of the on-road vehicles is configured to autonomously-upon-demand pick-up and integrate-with various objects; and a pool of objects comprising said various objects, in which each of the objects is associated with a respective functionality, thereby collectively supporting a variety of functionalities, and in which there are more objects in the pool than on-road vehicles in the system. In one embodiment, the system is configured to: determine current demands for various functionalities; determine, based on said current demands, a new assignment of functionalities for at least some of the on-road vehicles, in which said new assignment is expected to allow the fleet of on-road vehicles to better respond to the demands; and per each of the on-road vehicles for which a new assignment of functionality was determined, the on road vehicle is configured to: (i) release one of the objects that is currently integrated therewith, (ii) self drive from a current location of the on-road vehicle to a location of parking of another one of the objects that is associated with the respective functionality newly assigned, and (iii) upon arrival to the location of parking: straddle autonomously over the another object, thereby allowing the on-road vehicle to grab and lift autonomously said another object above ground, and thereby integrating autonomously the another object with the on-road vehicle, thus embedding in the on-road vehicle the respective functionality newly assigned.

BRIEF DESCRIPTION OF THE DRAWINGS

The embodiments are herein described by way of example only, with reference to the accompanying drawings. No attempt is made to show structural details of the embodiments in more detail than is necessary for a fundamental understanding of the embodiments. In the drawings:

FIG. 6A illustrates one embodiment of an on-road autonomous vehicle self-driving to a location in which a functional load is located;

FIG. 6B illustrates one embodiment of the functional load awaiting arrival of the on-road autonomous vehicle;

FIG. 6C illustrates one embodiment of the on-road autonomous vehicle picking up and transporting the functional load;

FIG. 6D illustrates one embodiment of the functional load after being placed by the on-road autonomous vehicle at a particular location operative to work in conjunction with or support the functional load;

FIG. 6E illustrates one embodiment of the on-road autonomous vehicle driving away after placing the functional load at the particular location;

FIG. 7A illustrates one embodiment of an on-road autonomous vehicle self-driving to a location in which a functional load is located;

FIG. 7B illustrates one embodiment of the on-road autonomous vehicle picking up the functional load and using a function associated with the functional load;

FIG. 7C illustrates one embodiment of a convoy of several on-road autonomous vehicles in which one of the on-road autonomous vehicles is carrying a functional load;

FIG. 12A illustrates one embodiment of an on-road autonomous vehicle carrying a load having a certain aerodynamic design and extending beyond a length of the on-road autonomous vehicle;

FIG. 13A illustrates one embodiment of an on-road autonomous vehicle currently integrated with a first object having drawers that are presently closed;

FIG. 13B illustrates one embodiment of the on-road autonomous vehicle still integrated with the first object and getting one of the drawers opened;

FIG. 14A illustrates one embodiment of an on-road autonomous vehicle currently integrated with a second object having a door that is presently closed;

FIG. 14B illustrates one embodiment of the on-road autonomous vehicle still integrated with the second object and getting the door opened;

DETAILED DESCRIPTION

Figure 1A:
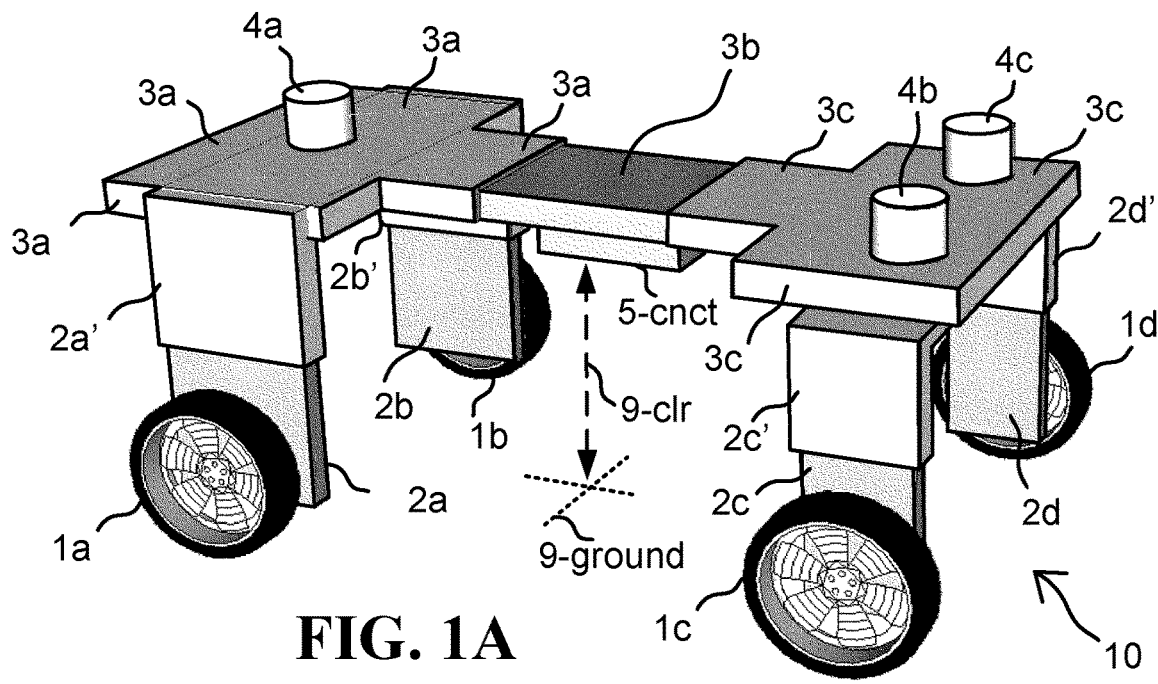
FIG. 1A illustrates one embodiment of an on-road autonomous vehicle operative to autonomously collect and transport a load over public roads.

FIG. 1A illustrates one embodiment of an on-road autonomous vehicle 10 operative to autonomously collect and transport a load over public roads. The on-road autonomous vehicle 10 comprises wheels 1 (1a, 1b, 1c, 1d) touching ground 9-ground, vertical structures 2 (2a, 2b, 2c), 2' (2a', 2b', 2c') mounted on the wheels, an upper horizontal structure 3 (3a, 3b, 3c), a plurality of sensors 4 (4a, 4b, 4c), and a first connector 5-cnct having a certain clearance 9-clr above ground 9-ground.

Figure 1B:
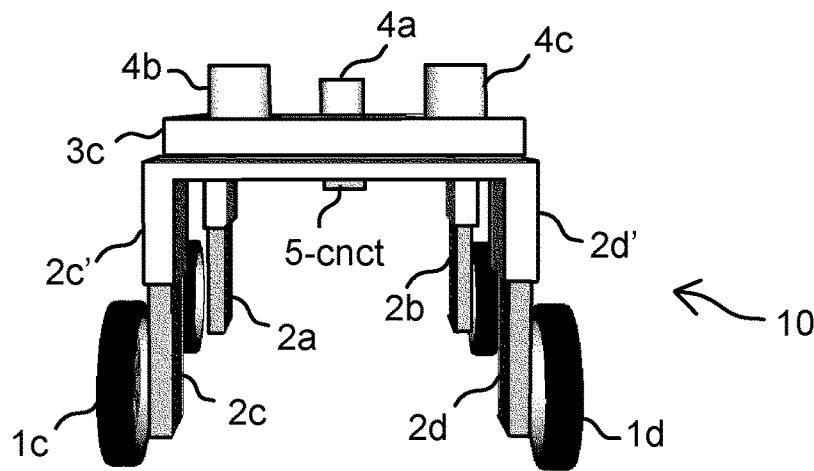
FIG. 1B illustrates one embodiment of the on-road autonomous vehicle as seen from a front view.

FIG. 1B illustrates one embodiment of the on-road autonomous vehicle 10 as seen from a front view.

Figure 1C:
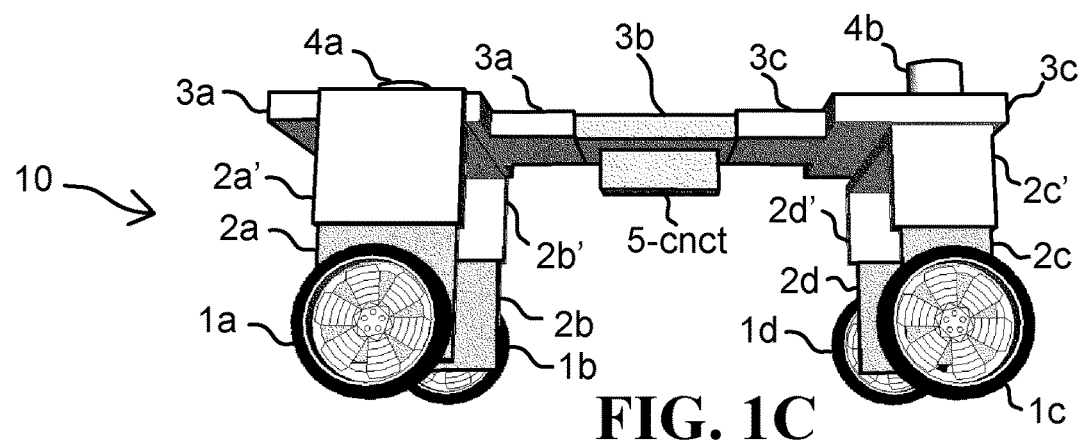
FIG. 1C illustrates one embodiment of the on-road autonomous vehicle as seen from a side view.

FIG. 1C illustrates one embodiment of the on-road autonomous vehicle 10 as seen from a side view.

Figure 1D:
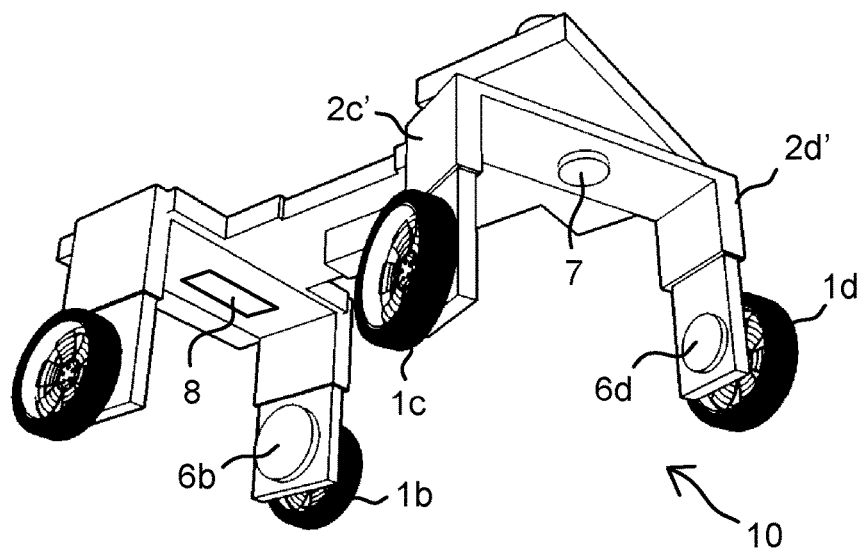
FIG. 1D illustrates one embodiment of the on-road autonomous vehicle as seen from below.

FIG. 1D illustrates one embodiment of the on-road autonomous vehicle 10 as seen from below. The on-road autonomous vehicle 10 further comprises a control sub-system 4 (FIG. 1A), 6, 7, 8 comprising a processing unit 8 and a plurality of sensors 4 (4a, 4b, 4c, FIG. 1A) and actuators 6, 7.

Figure 2A:
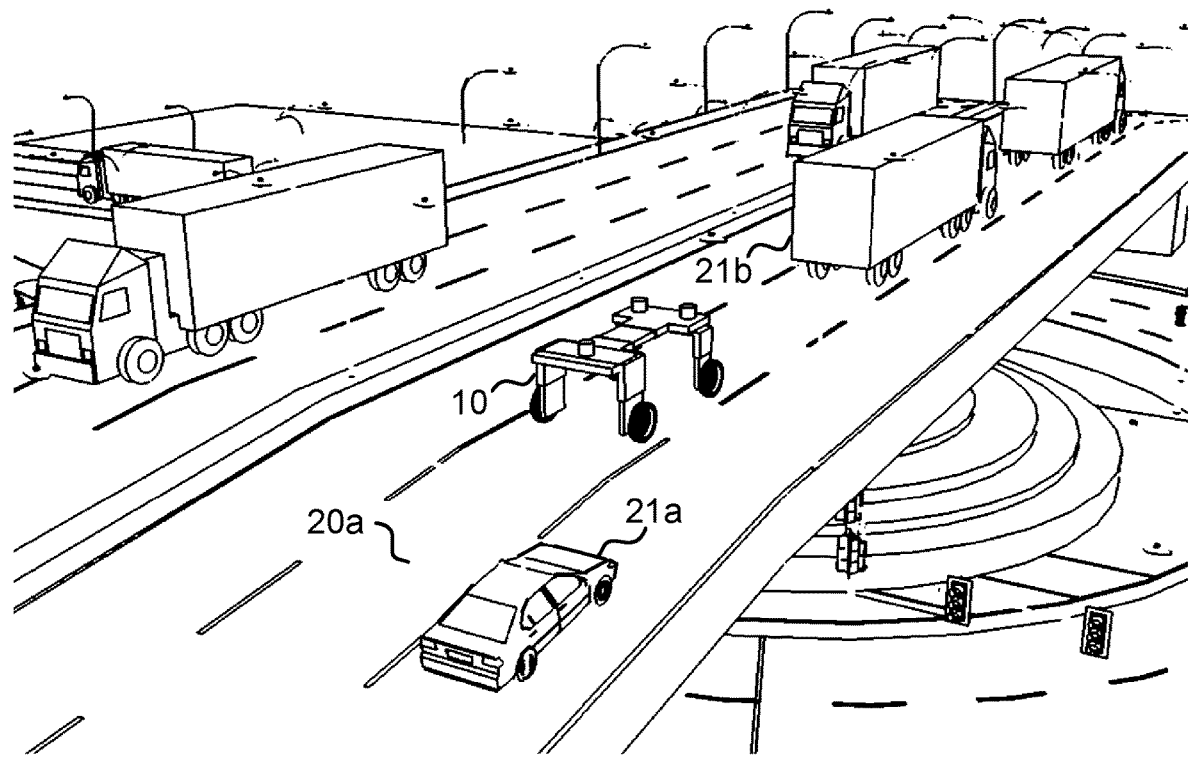
FIG. 2A illustrates one embodiment of an on-road autonomous vehicle self-driving without a load over a public road and alongside regular traffic.

FIG. 2A illustrates one embodiment of the on-road autonomous vehicle 10 self-driving without the load over a public road 20a and alongside regular traffic 21a, 21b.

Figure 2B:
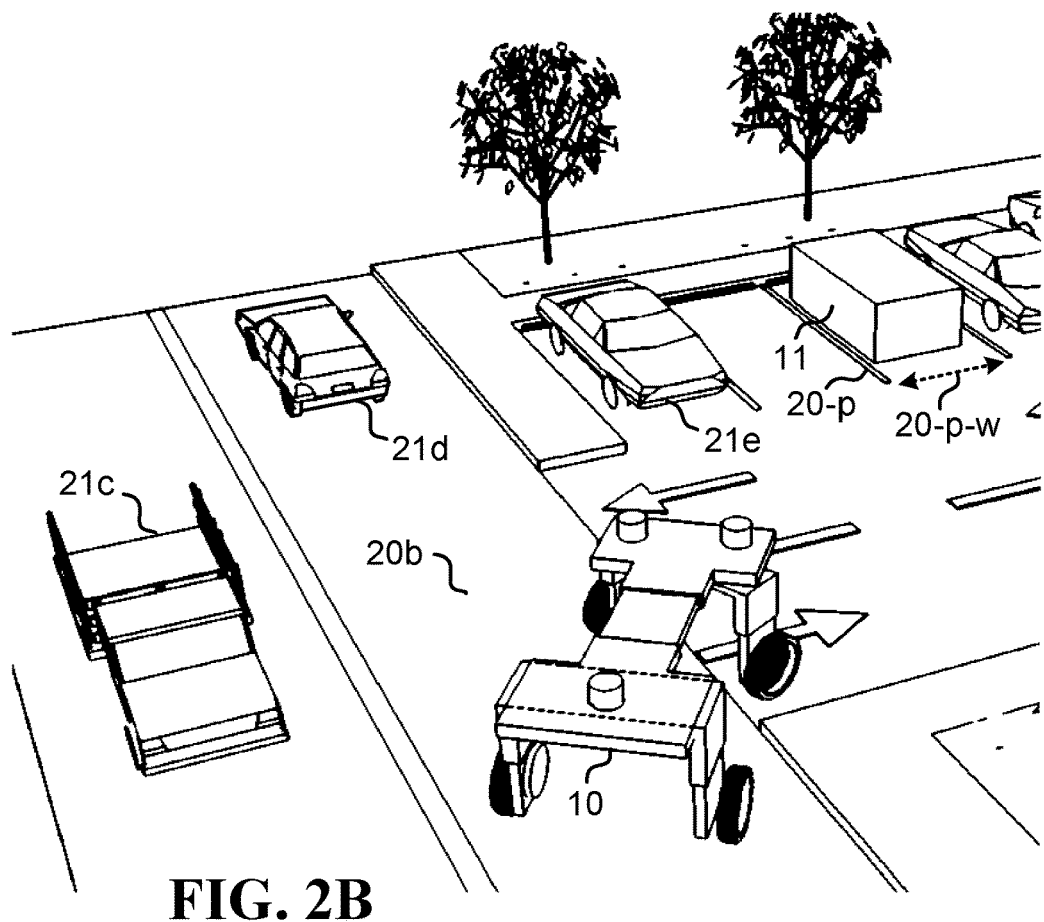
FIG. 2B illustrates one embodiment of the on-road autonomous vehicle arriving at a parking lot in which a load is parked.

FIG. 2B illustrates one embodiment of the on-road autonomous vehicle 10 arriving at a parking lot 20-p in which the load 11 is parked. The parking lot 20-p has a certain width 20-p-w. 21c, 21d, 21e are other vehicles, and 20b is a public road.

Figure 2C:
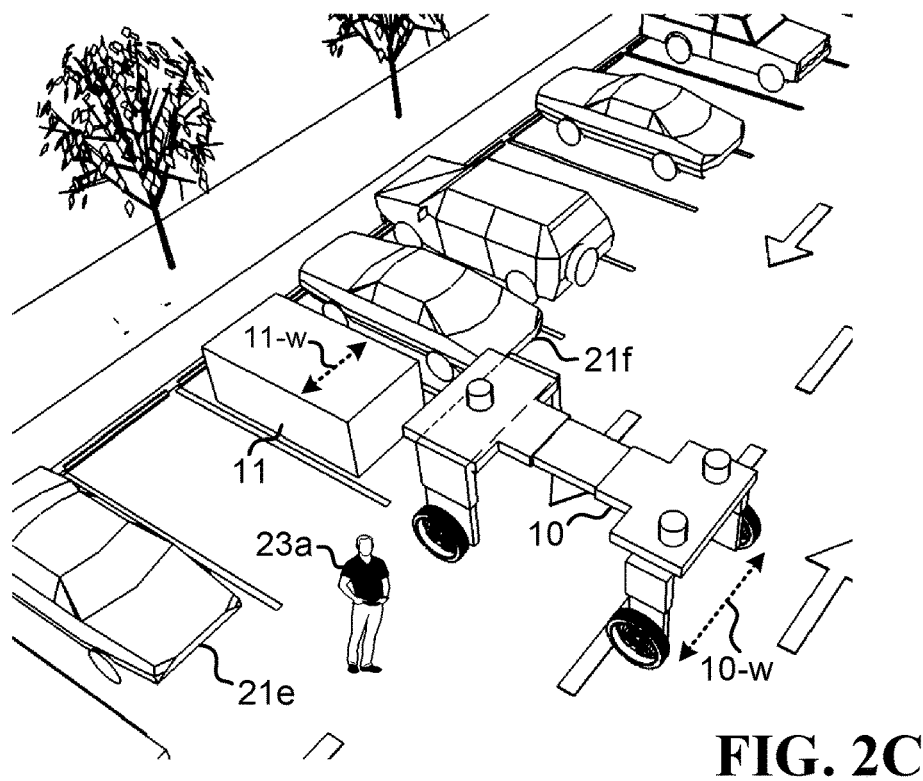
FIG. 2C illustrates one embodiment of the on-road autonomous vehicle getting ready to pick up the load.

FIG. 2C illustrates one embodiment of the on-road autonomous vehicle 10 getting ready to pick up the load 11. The load has a certain width 11-w, and the on-road autonomous vehicle 10 has a certain width 10-w. 23a is a pedestrian, and 21f is a vehicle parking alongside the load 11.

Figure 3A:
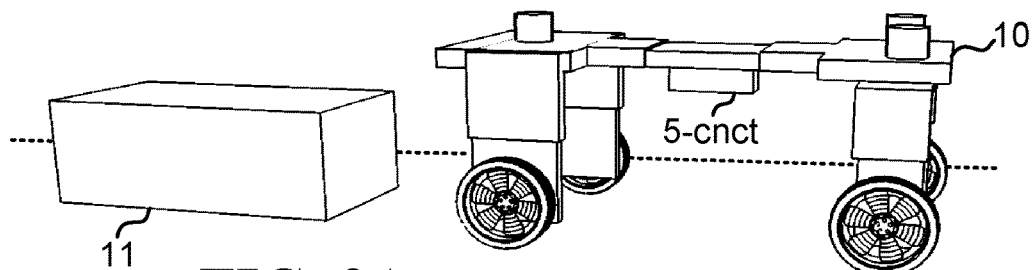
FIG. 3A illustrates one embodiment of an on-road autonomous vehicle getting ready to pick up a load.

FIG. 3A illustrates one embodiment of the on-road autonomous vehicle 10 getting ready to pick up the load 11.

Figure 3B:
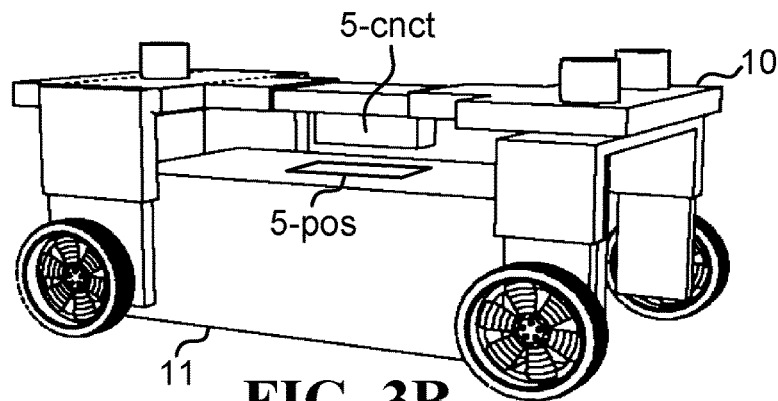
FIG. 3B illustrates one embodiment of the on-road autonomous vehicle moving/straddling over the load.

FIG. 3B illustrates one embodiment of the on-road autonomous vehicle 10 moving/straddling over the load 11 and getting the connector 5-cnct over a certain position 5-pos associated with the load 11.

Figure 3C:
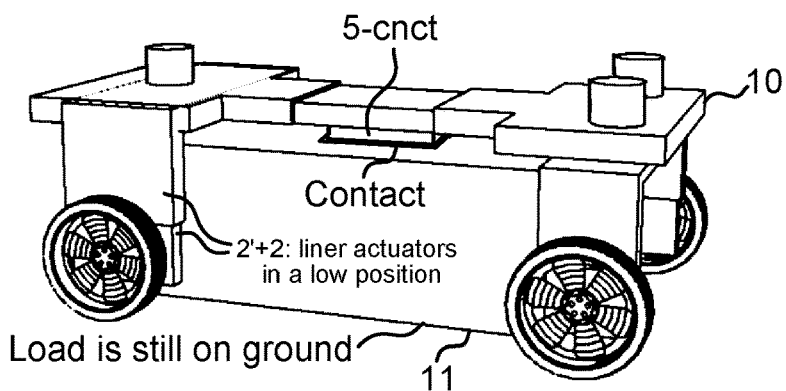
FIG. 3C illustrates one embodiment of the on-road autonomous vehicle getting into a lower position and grabbing the load.

FIG. 3C illustrates one embodiment of the on-road autonomous vehicle 10 getting into a lower position and grabbing the load 11.

Figure 3D:
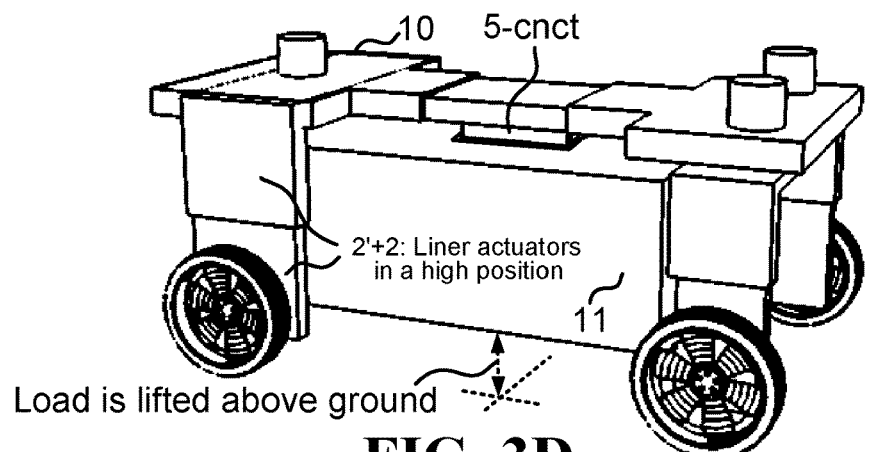
FIG. 3D illustrates one embodiment of the on-road autonomous vehicle picking up the load.

FIG. 3D illustrates one embodiment of the on-road autonomous vehicle 10 picking up the load 11.

Figure 4A:
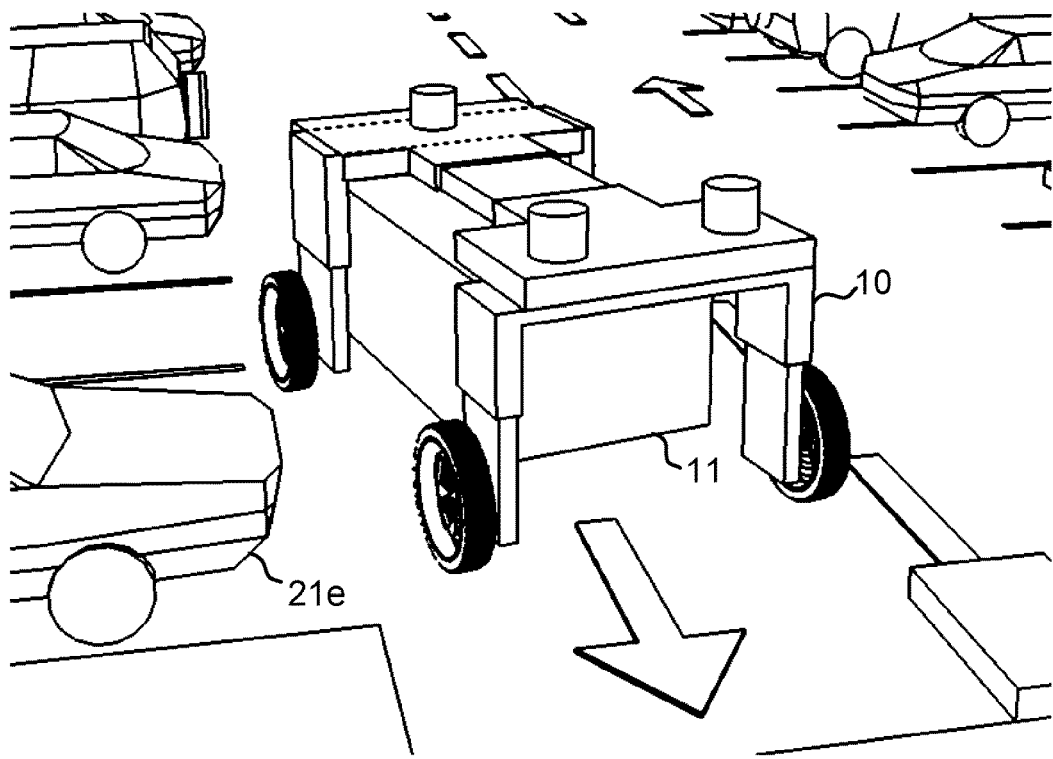
FIG. 4A illustrates one embodiment of an on-road autonomous vehicle driving away with a load that was previously parked in a parking lot.

FIG. 4A illustrates one embodiment of the on-road autonomous vehicle 10 driving away with the load 11 that was previously parked in the parking lot.

Figure 4B:
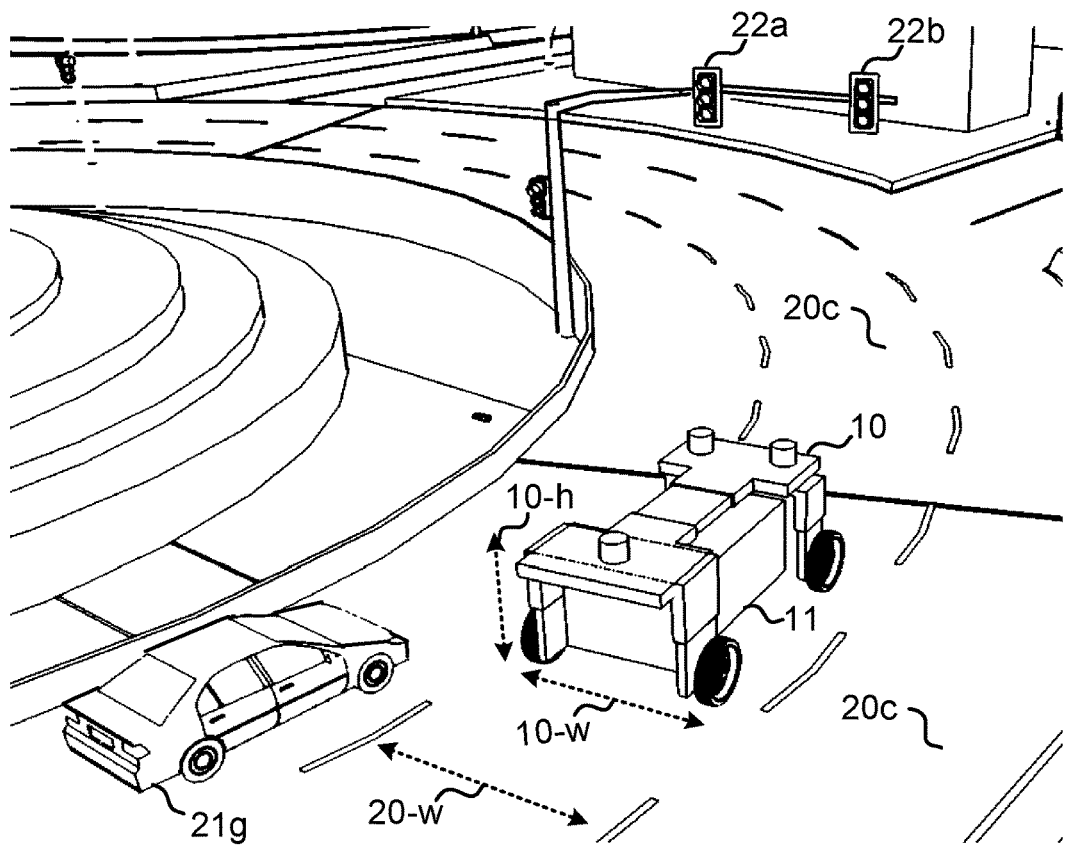
FIG. 4B illustrates one embodiment of the on-road autonomous vehicle self-driving with the load over a public road and alongside regular traffic.

FIG. 4B illustrates one embodiment of the on-road autonomous vehicle 10 self-driving with the load 11 over a public road 20c and alongside regular traffic 21g. 22a, 22b are traffic lights or other traffic signs. The public road 20c has a certain lane width 20-w. The on-road autonomous vehicle 10 has a certain width 10-w and a certain height 10-h.

In one embodiment, the on-road autonomous vehicle 10 is operative to autonomously collect and transport loads over public roads.

In one embodiment, the on-road autonomous vehicle comprises an upper horizontal structure 3 (3a, 3b, 3c) elevated above ground 9-ground (FIG. 1A) by vertical structures 2 (2a, 2b, 2c), 2' (2a', 2b', 2c') mounted on at least four wheels 1 (1a, 1b, 1c, 1d) touching ground 9-ground, so as to create a certain clearance 9-clr above ground for at least a first connector 5-cnct associated with the upper horizontal structure 3 and attached thereunder.

In one embodiment, the on-road autonomous vehicle comprises a control sub-system 4, 6, 7, 8 comprising a processing unit 8 (FIG. 1D) and a plurality of sensors 4 (4a, 4b, 4c) and actuators 6, 7 (FIG. 1D), in which the control sub-system is configured to generate, in real-time, a three-dimensional representation of surrounding environment using data collected by the plurality of sensors 4.

In one embodiment, the on-road autonomous vehicle comprises at least a first linear actuator 2'+2 (2' moving up and down relative to 2, i.e. 2a' moving relative to 2a, 2b' moving relative to 2b, 2c' moving relative to 2c, and 2d' moving relative to 2d) configured to control and set said certain clearance 9-clr of the first connector 5-cnct, by causing the first connector 5-cnct, or the entire upper horizontal structure 3, to move up or down relative to ground 9-ground.

In one embodiment, the control sub-system 4, 6, 7, 8 is further configured to use said three-dimensional representation, said actuators 6, 7, and said processing unit 8 in conjunction with a set of public-road self-driving directives, to: (i) self-drive (FIG. 2A, FIG. 2B) the on-road autonomous vehicle 10, over public roads 20a (FIG. 2A), 20b (FIG. 2B) and alongside regular car traffic 21a, 21b, 21c, 21d, 21e, 21f (FIG. 2A, FIG. 2B, FIG. 2C), to a location in which a first load 11 (FIG. 2B) is parked, (ii) position the on-road autonomous vehicle 10 in front of the load 11 (FIG. 2C, FIG. 3A), and (iii) straddle the on-road autonomous vehicle 10 over the first load 11 (FIG. 3B), such that said first connector 5-cnct is brought to a predetermined position 5-pos over the first load 11 (FIG. 3B).

In one embodiment, the control sub-system 4, 6, 7, 8 is further configured to use the first linear actuator 2'+2 to: (i) lower (FIG. 3C) the first connector 5-cnct into mechanical contact with the first load 11 thereby allowing the connector to connect to or grab the first load, and (ii) lift (FIG. 3D) the first load 11 above ground into a position operative to self-transport (FIG. 4A, FIG. 4B) the first load 11 over public roads 20c (FIG. 4B) and alongside regular car traffic 21e (FIG. 4A), 21g (FIG. 4B).

In one embodiment, the plurality if sensors 4 comprises a plurality of digital cameras together covering front, sides, and back of the on-road autonomous vehicle 10, thereby facilitating said generation of three-dimensional representation of surrounding environment.

In one embodiment, the plurality of sensors 4 comprises at least one radar device, thereby farther facilitating said generation of three-dimensional representation of surrounding environment.

In one embodiment, the plurality if sensors 4 comprises at least one light-detection-and-ranging (LIDAR) laser device, thereby farther facilitating said generation of three-dimensional representation of surrounding environment.

In one embodiment, the plurality of sensors 4 comprises at least two of: (i) a plurality of digital cameras, (ii) a LIDAR laser device, and (iii) a radar device, in which said generation of three-dimensional representation of surrounding environment is achieved using data fusion techniques acting on a combination of signals generated in real time by the plurality of sensors.

In one embodiment, said surrounding environment comprises at least the public roads 20a (FIG. 2A), 20b (FIG. 2B), 20c (FIG. 4B) surrounding the on-road autonomous vehicle 10, regular car traffic 21a, 21b, 21c, 21d, 21e, 21f, 21g surrounding the on-road autonomous vehicle 10, traffic lights 22a, 22b (FIG. 4B) and other traffic signs surrounding the on-road autonomous vehicle 10, and pedestrians 23a (FIG. 2C) surrounding the on-road autonomous vehicle 10, in which said three-dimensional representation in conjunction with said set of public-road self-driving directives are operative to facilitate said self-driving.

In one embodiment, said plurality of sensors 4 in conjunction with said data fusion and three-dimensional representation of surrounding environment are operative to detect said load 11 and to facilitate said positioning (FIG. 2C, FIG. 3A) of the on-road autonomous vehicle 10 in front of the load and said straddling (FIG. 3B) of the on-road autonomous vehicle 10 over the load 11.

In one embodiment, said on-road autonomous vehicle 10 is narrow enough to facilitate said self driving over public roads 20 and in conjunction with a width 20-w (FIG. 4B) associated with a standard lane in public roads 20c, in which said standard lane has the width 20-w of between 2.5 (two point five) meters and 3.7 (three point seven) meters. In one embodiment, the on-road autonomous vehicle 10 has a width 10-w (FIG. 4B) of below 2.5 (two point five) meters. In one embodiment, said load 11 has a width 11-w (FIG. 2C) of below 2 meters, and said load 11 is narrower than said on-road autonomous vehicle 10 (i.e., 11-w is narrower than 10-w in FIG. 2C), in order to facilitate said straddling (FIG. 3B) of the on-road autonomous vehicle 10 over the load 11.

In one embodiment, said location in which the load 11 is parked is a standard parking lot 20-p (FIG. 2B) in a parking area, in which said standard parking lot has a width 20-p-w of between 2.3 (two point three) meters and 2.7 (two point seven) meters, and said on-road autonomous vehicle 10 is narrow enough to facilitate said straddling of the on-road autonomous vehicle over the load 11 while the load is parked in said standard parking lot 20-p and without the on-road autonomous vehicle exceeding the width 20-p-w of the standard parking lot (i.e., 11-w is narrower than 10-w, and 10-w is narrower than 20-p-w). In one embodiment, the on-road autonomous vehicle 10 has a width 10-w of below 2.3 (two point three) meters. In one embodiment, said load 11 has a width 11-w of below 1.8 (one point eight) meters, and said load 11 is narrower than said on-road autonomous vehicle 10, in order to facilitate said straddling of the on-road autonomous vehicle 10 over the load 11 while the load is parked in said standard parking lot 20-p.

In one embodiment, a height 10-h (FIG. 4B) of said on-road autonomous vehicle 10 does not exceed a width 10-w of the on-road autonomous vehicle 10, thereby facilitating a center of gravity which is low enough to facilitate regular car traffic maneuvers in conjunction with said public roads 20a (FIG. 2A), 20b (FIG. 2B), 20c (FIG. 4B) and alongside regular car traffic 21a, 21b, 21c, 21d, 21e, 21f, 21g. In one embodiment, said maneuvers comprise traveling at a velocity exceeding 80 (eighty) kilometers-per-hour. In one embodiment, said maneuvers comprise a centripetal acceleration of above 3 (three) meters-per-second-square (m/s*s). In one embodiment, said width 10-w is between 2 (two) meters and 2.5 (two point five) meters, and said height 10-h is below 2 (two) meters.

In one embodiment, said actuators 6, 7 comprise electrical motors 6b, 6d capable of linearly accelerating and de-accelerating the on-road autonomous vehicle 10 at a rate of at least 3 (three) meters-per-second-square (m/s*s), thereby avoiding car-accidents in conjunction with said public roads 20a (FIG. 2A), 20b (FIG. 2B), 20c (FIG. 4B) and regular car traffic 21a, 21b, 21c, 21d, 21e, 21f, 21g.

In one embodiment, said lifting (FIG. 3D) is done so as to lift the load 11 to a position which is not more than 50 cm (fifty centimeters) above ground, thereby facilitating a center of gravity which is low enough to facilitate regular car traffic maneuvers in conjunction with said public roads 20a (FIG. 2A), 20b (FIG. 2B), 20c (FIG. 4B) and alongside regular car traffic 21a, 21b, 21c, 21d, 21e, 21f, 21g.

In one embodiment, said positioning and straddling comprises: using said three-dimensional representation of surrounding environment to accurately represent the load 11 and position the on-road autonomous vehicle 10 in front to the load, and using slow and controlled acceleration to slowly move forward while maintaining constant and regular spacing between the load 11 and the inner surfaces of the on-road autonomous vehicle 10, until predicting accurate positioning of the on-road autonomous vehicle 10 above the load 11.

In one embodiment, said first liner actuator 2'+2 is a distributed linear actuator comprising several sub-actuators (e.g., four sub-actuators: 2a' moving relative to 2a, 2b' moving relative to 2b, 2c' moving relative to 2c, and 2d' moving relative to 2d), in which each sub-actuator is associated with one of the wheels, such that the entire upper horizontal structure 3 is operative to move up and down relative to the wheels and ground.

In one embodiment, the sub-actuators are also operative to act as springs or mechanical dumpers for the wheels relative to the upper horizontal structure.

In one embodiment, said first liner actuator is embedded in the first connector 5-cnct, thereby causing only the connector to move up and down relative to ground, and such that the upper horizontal structure 3 remains in place.

Figure 4C:
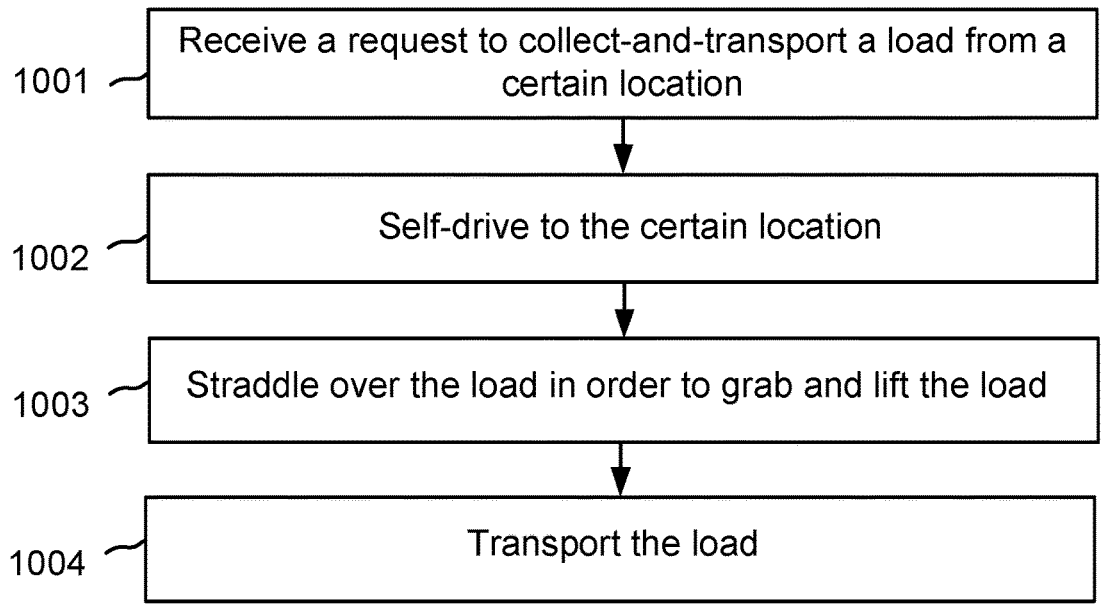
FIG. 4C illustrates one embodiment of a method for autonomously collecting and transporting a load over public roads.

FIG. 4C illustrates one embodiment of a method for autonomously collecting and transporting a load over public roads. In step 1001, receiving, in conjunction with an on-road autonomous vehicle 10, a request to collect-and-transport a load 11 which is currently parked in a certain location 20-p. In step 1002, self-driving (FIG. 2A, FIG. 2B, FIG. 2C), by the on-road autonomous vehicle, over public roads 20a (FIG. 2A), 20b (FIG. 2B) and alongside regular car traffic 21a, 21b, 21c, 21d, 21e, 21f, from a current location of the on-road autonomous vehicle to said certain location 20-p of the load 11. In step 1003, upon arrival to said certain location 20-p, straddling autonomously (FIG. 3B, and the transition from FIG. 3A to FIG. 3B), by the on-road autonomous vehicle 10, over the load 11, thereby allowing the on-road autonomous vehicle to grab (FIG. 3C) and lift autonomously (FIG. 3D, or the transition from FIG. 3C to FIG. 3D) the load 11 above ground in a linear upward movement that creates a full clearance of the load 11 above ground. In step 1004, transporting autonomously (FIG. 4A, FIG. 4B) the load 11, by the on-road autonomous vehicle 10, over public roads 20c (FIG. 4B) and alongside regular traffic 21e (FIG. 4A), 21g (FIG. 4B), while the load 11 is hanging underneath the on-road autonomous vehicle 10 and such that the entire load 11 maintains said full clearance above ground during transport. In one embodiment, autonomously navigating, by the on-road autonomous vehicle, to a destination location, and lowering the load 11 at the destination location in a linear downward movement that places the load on the ground (a reverse transition from FIG. 3D to FIG. 3C).

Figure 4D:
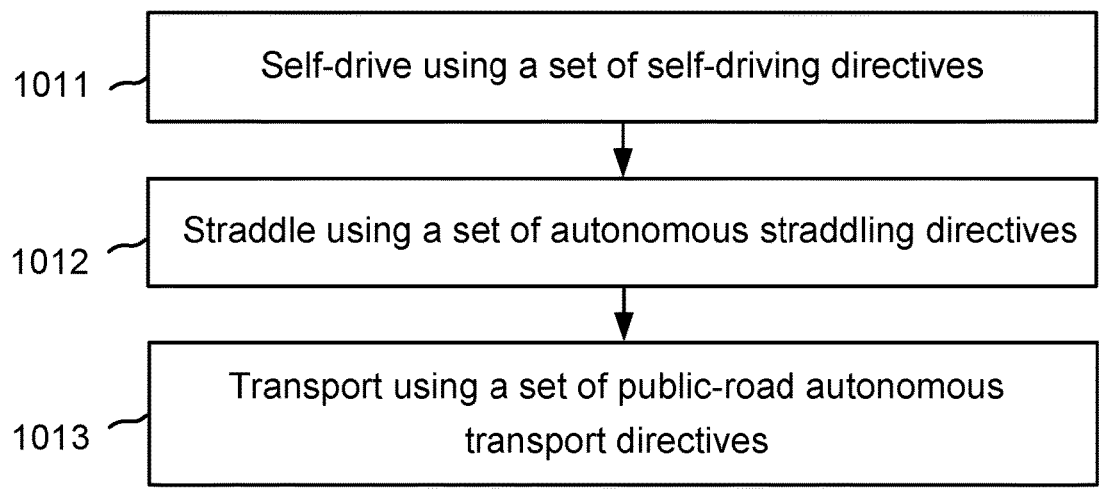
FIG. 4D illustrates one embodiment of another method for autonomously collecting and transporting a load over public roads.

FIG. 4D illustrates one embodiment of a method for autonomously collecting and transporting a load over public roads. In step 1011, self-driving using a set of public-road self-driving directives, by an on-road autonomous vehicle 10, over public roads 20a (FIG. 2A), 20b (FIG. 2B) and alongside regular car traffic 21a, 21b, 21c, 21d, 21e, 21f, from a current location of the on-road autonomous vehicle to a certain location 20-p of the load 11. In step 1012, upon arrival to said certain location 20-*p*, straddling autonomously (FIG. 3B, and the transition from FIG. 3A to FIG. 3B), using a set of autonomous straddling directives, by the on-road autonomous vehicle 10, over the load 11, thereby allowing the on-road autonomous vehicle to grab (FIG. 3C) and lift autonomously (FIG. 3D, or the transition from FIG. 3C to FIG. 3D) the load 11 above ground in a linear upward movement that creates a full clearance of the load 11 above ground. In step 1013, transporting autonomously (FIG. 4A, FIG. 4B) the load 11 using a set of public-road autonomous transport directives, by the on-road autonomous vehicle 10, over public roads 20c (FIG. 4B) and alongside regular traffic 21e (FIG. 4A), 21g (FIG. 4B), while the load 11 is hanging underneath the on-road autonomous vehicle 10 and such that the entire load 11 maintains said full clearance above ground during transport. In one embodiment, said public-road self-driving directives are fine-tuned to facilitate said self-driving during a period that the on-road autonomous vehicle 10 does not transport the load 11, and is therefore (i) lighter and (ii) has a higher center of gravity; said public-road autonomous transport directives are fine-tuned to facilitate said transporting during a period that the on-road autonomous vehicle 10 transports the load 11, and is therefore (i) heavier and (ii) has a lower center of gravity; and said autonomous straddling directives are fine-tuned to facilitate said straddling by directing a slow approach and slow straddling of the on-road autonomous vehicle 10 over the load 11 and into an accurate final position above the load.

Figure 5A:
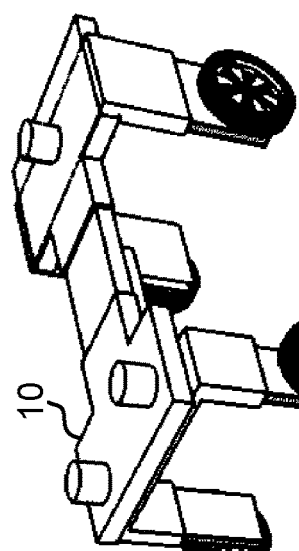
FIG. 5A illustrates one embodiment of an on-road autonomous vehicle self-driving to a location in which a passenger in a cabin is located.

FIG. 5A illustrates one embodiment of an on-road autonomous vehicle 10 self-driving to a location in which a passenger in a cabin is located.

Figure 5B:
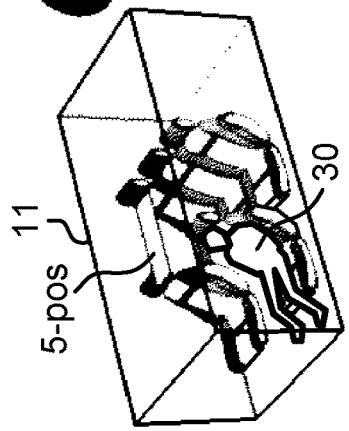
FIG. 5B illustrates one embodiment of the passenger in the cabin awaiting arrival of the on-road autonomous vehicle.

FIG. 5B illustrates one embodiment of the passenger 30 in the cabin 11 awaiting arrival of the on-road autonomous vehicle 10. 5-pos is a position in the cabin 11 that facilitates grabbing or connecting to the cabin 11.

Figure 5C:
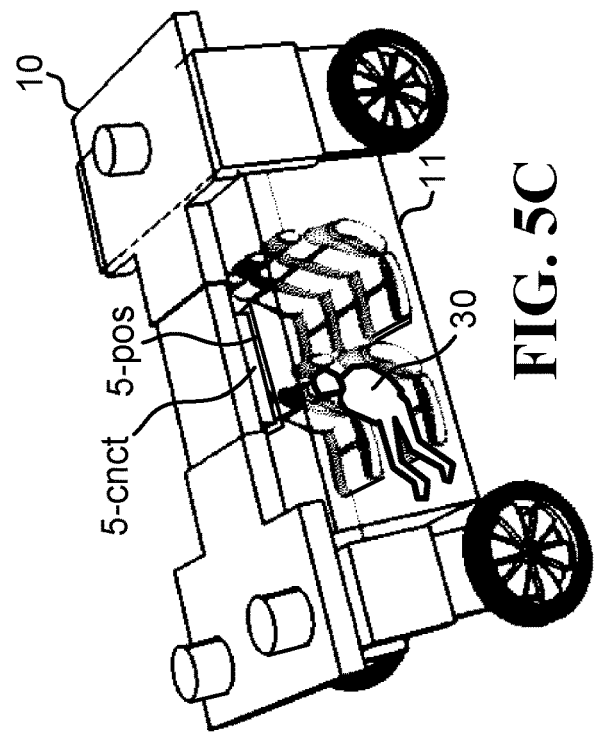
FIG. 5C illustrates one embodiment of the on-road autonomous vehicle picking up the cabin with the passenger.

FIG. 5C illustrates one embodiment of the on-road autonomous vehicle 10 picking up the cabin 11 with the passenger 30. The cabin 11 is now connected to the on-road autonomous vehicle 10 via connector 5-cnct and in conjunction with position 5-pos.

Figure 5D:
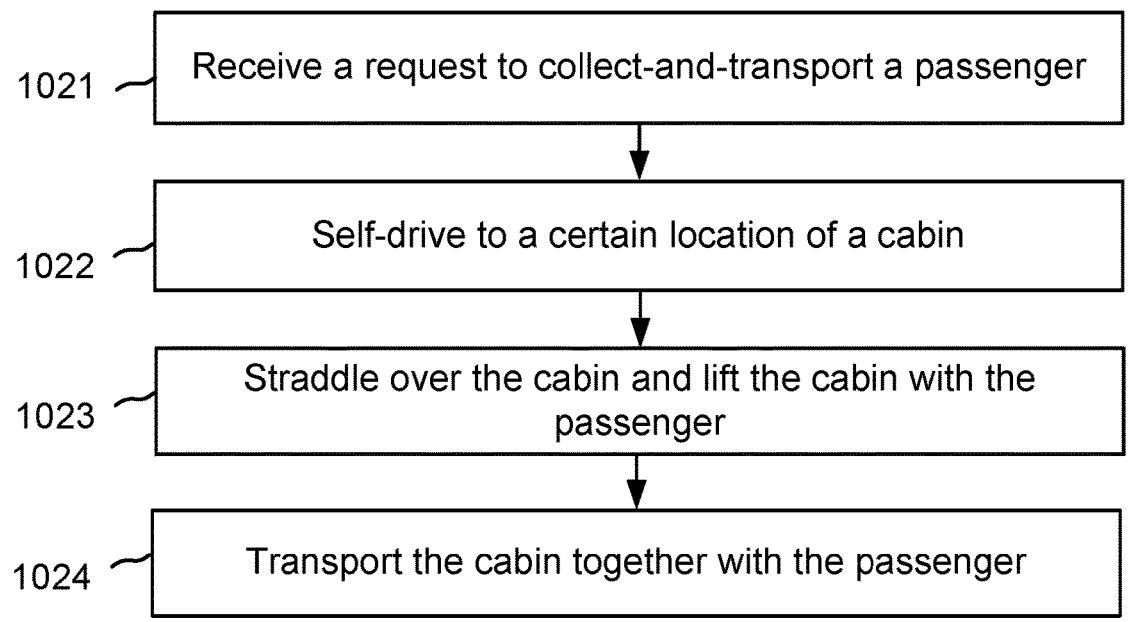
FIG. 5D illustrates one embodiment of a method for autonomously collecting and transporting a passenger in a cabin.

FIG. 5D illustrates one embodiment of a method for autonomously collecting and transporting a passenger in a cabin. In step 1021, receiving, in conjunction with an on-road autonomous vehicle 10 (FIG. 5A), from a passenger 30 (FIG. 5B) associated with a cabin 11 (FIG. 5B) located in a certain location, a request to collect-and-transport the passenger together with the cabin. In step 1022, self-driving (FIG. 2A), by the on-road autonomous vehicle 10, from a current location of the on-road autonomous vehicle to said certain location of the cabin 11 (FIG. 5B). In step 1023, upon arrival to said certain location: (i) confirming that the passenger 30 is indeed in the cabin 11 (FIG. 5B), and (ii) straddling autonomously, by the on-road autonomous vehicle 10, over the cabin 11 (FIG. 3B), thereby allowing the on-road autonomous vehicle 10 to grab and lift autonomously (FIG. 3C, FIG. 3D) the cabin 11, together with the passenger 30, above ground (FIG. 5C). In step 1024, transporting autonomously the cabin 11 together with the passenger 30, by the on-road autonomous vehicle 10, while the cabin 11 is hanging underneath the on-road autonomous vehicle (FIG. 4B). In one embodiment, the method further includes: receiving, in conjunction with the on-road autonomous vehicle 10, a second request to collect-and-transport a cargo 11 which is currently located in a second location 20-*p* (FIG. 2B); self-driving (FIG. 2A, FIG. 2B, FIG. 2C), by the on-road autonomous vehicle 10, over public roads 20a (FIG. 2A), 20b (FIG. 2B) and alongside regular car traffic 21a, 21b, 21c, 21d, 21e, 21f, from a current location of the on-road autonomous vehicle to said second location 20-*p*; upon arrival to said second location 20-*p*, straddling autonomously (FIG. 3B, and the transition from FIG. 3A to FIG. 3B), by the on-road autonomous vehicle 10, over the cargo 11, thereby allowing the on-road autonomous vehicle 10 to grab (FIG. 3C) and lift autonomously (FIG. 3D, or the transition from FIG. 3C to FIG. 3D) the cargo 11 above ground in a linear upward movement that creates a full clearance of the cargo 11 above ground; and transporting autonomously (FIG. 4A, FIG. 4B) the cargo 11, by the on-road autonomous vehicle 10, over public roads 20c (FIG. 4B) and alongside regular traffic 21e (FIG. 4A), 21g (FIG. 4B), while the cargo 11 is hanging underneath the on-road autonomous vehicle 10 and such that the entire cargo 11 maintains said full clearance above ground during transport, thereby facilitating dual use of the on-road autonomous vehicle 10 for both said transporting of the passenger 30 during a certain period of time and said transporting of the cargo 11 during another period of time. In one embodiment, said transporting of the passenger 30 or other passengers is done during the mornings or the evenings and in conjunction with work rush hours, while said transporting of the cargo 11 or other cargo is done during mid-day hours, while most people are working.

Figure 5E:
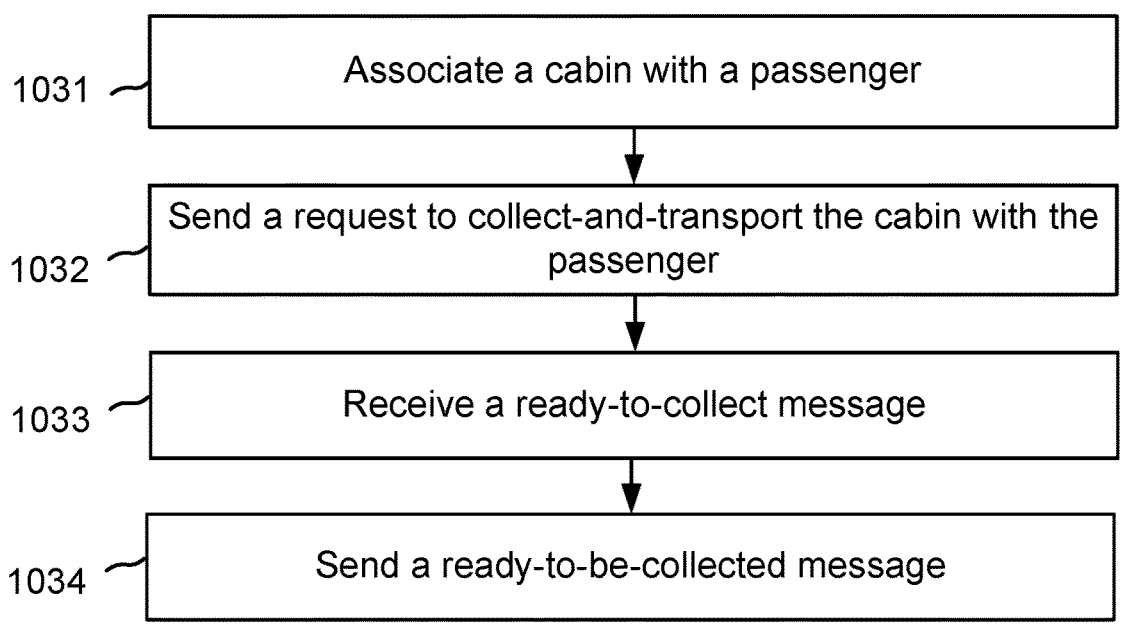
FIG. 5E illustrates one embodiment of a method for requesting autonomous collection and transporting of a passenger in a cabin.

FIG. 5E illustrates one embodiment of a method for requesting autonomous collection and transporting of a passenger in a cabin. In step 1031, associating a cabin 11 with a passenger 30 (FIG. 5B). In step 1032, sending, in conjunction with the cabin 11, a request to collect-and-transport the cabin together with the passenger 30. In step 1033, receiving, in conjunction with the cabin 11, a ready-to-collect message from an on-road autonomous vehicle 10 (FIG. 5A). In step 1034, sending, in conjunction with the cabin 11, a ready-to-be-collected message to the on-road autonomous vehicle 10, thereby facilitating collection and transporting of the passenger 30 in the cabin 11 (FIG. 5C).

FIG. 6A illustrates one embodiment of an on-road autonomous vehicle 10 self-driving to a location 28 (FIG. 6B) in which a functional load 11 is located.

FIG. 6B illustrates one embodiment of the functional load 11 awaiting arrival of the on-road autonomous vehicle 10.

FIG. 6C illustrates one embodiment of the on-road autonomous vehicle 10 picking up and transporting the functional load 11.

FIG. 6D illustrates one embodiment of the functional load 11 after being placed by the on-road autonomous vehicle 10 at a particular location 29 operative to work in conjunction with or support the functional load 11 using an interface 29-rec.

FIG. 6E illustrates one embodiment of the on-road autonomous vehicle 10 driving away after placing the functional load 11 at the particular location.

Figure 6F:
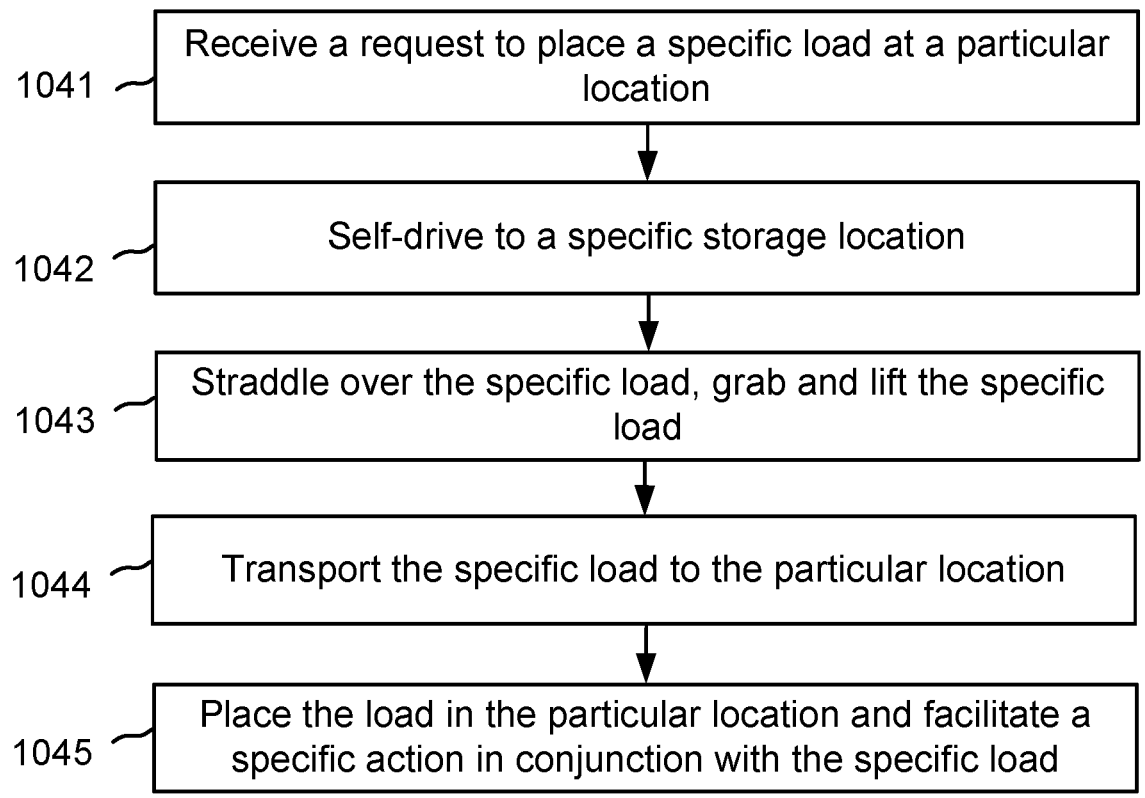
FIG. 6F illustrates one embodiment of a method for autonomously collecting transporting and placing a functional load according to a request.

FIG. 6F illustrates one embodiment of a method for autonomously collecting transporting and placing a functional load according to a request. In step 1041, receiving, in conjunction with an on-road autonomous vehicle 10 (FIG. 6A), a request to place a specific load 11 (FIG. 6B) at a particular location 29 (FIG. 6D), in which the specific load 11 is operative to perform a specific function. In step 1042, self-driving, by the on-road autonomous vehicle 10, to a specific storage location 28 (FIG. 6B) of the specific load 11. In step 1043, upon arrival to said specific storage location 28, straddling autonomously (FIG. 3B, and the transition from FIG. 3A to FIG. 3B), by the on-road autonomous vehicle 10, over the specific load 11, thereby allowing the on-road autonomous vehicle to grab (FIG. 3C) and lift autonomously (FIG. 3D, or the transition from FIG. 3C to FIG. 3D) the specific load 11 above ground in a linear upward movement that creates a full clearance of the specific load 11 above ground. In step 1044, transporting autonomously (FIG. 4B) the specific load 11, by the on-road autonomous vehicle 10, over public roads 20*c* (FIG. 4B) and alongside regular traffic 21*g* (FIG. 4B), to the particular location 29 (FIG. 6D), while the specific load 11 is hanging (FIG. 6C) underneath the on-road autonomous vehicle 10 and such that the entire specific load 11 maintains said full clearance above ground during transport. In step 1045, upon arrival to the particular location 29, lowering the specific load 11 at the particular location 29 (FIG. 6D) in a linear downward movement that places the load down (a reverse transition from FIG. 3D to FIG. 3C), thereby facilitating performance of the specific action in conjunction with the particular location 29.

In one embodiment, said linear downward movement creates a physical contact between the specific load 11 and a reception element or interface 29-rec (FIG. 6D) at the particular location 29, thereby enabling said specific function in conjunction with the physical contact.

In one embodiment, the specific function is fluid or gas transfer, and the physical contact with the interface 29-rec, which comprises ducts, enables said fluid or gas transfer.

In one embodiment, the specific function is electrical charge transfer, and the physical contact with the interface 29-rec, which comprises electrical contact, enables said electrical charge transfer.

In one embodiment, said specific function comprises at least one of: (i) fluid transfer such as water or gasoline transfer, (ii) gas transfer such as methane transfer, (iii) electrical charge transfer in which the specific load 11 is a rechargeable battery, (iv) automatic vending in which the specific load 11 is an automatic vending machine, (v) communication relaying in which the specific load 11 is a communication relay or a cellular base station, (vi) waste collection in which the specific load 11 is a waste container, (vii) monitoring, surveillance, or intelligence gathering, and (viii) distribution of objects such as drones, other autonomous vehicles, and munitions.

One embodiment further comprises straddling away (FIG. 6E) from the specific load 11, by the on-road autonomous vehicle 10, thereby leaving the specific load 11 (FIG. 6D) at the particular location 29 to perform said specific function.

FIG. 7A illustrates one embodiment of an on-road autonomous vehicle 10 self-driving to a location 27 in which a functional load 11-func is located.

FIG. 7B illustrates one embodiment of the on-road autonomous vehicle 10 picking up the functional load 11-func, interfacing 5-int with the functional load 11-func, and using a function associated with the functional load 11-func.

FIG. 7C illustrates one embodiment of a convoy of several on-road autonomous vehicles 10*a*, 10*b*, 10*c*, 10*d* in which one of the on-road autonomous vehicles 10*a* is carrying a functional load 10-func. 11*b*, 11*c*, 11*d* are general loads.

Figure 7D:
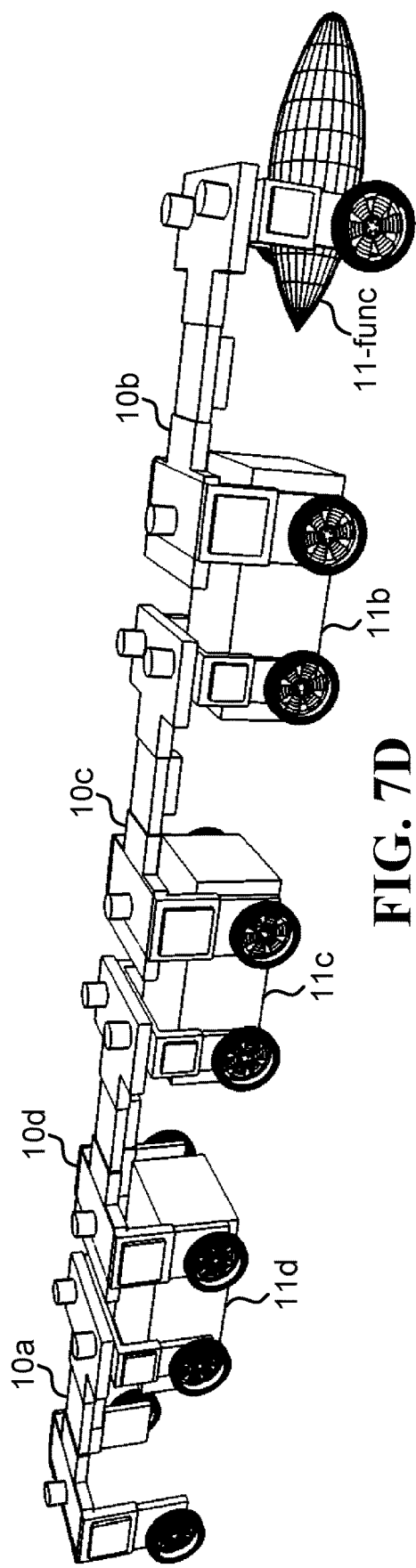
FIG. 7D illustrates one embodiment of the convoy of several on-road autonomous vehicles in which the on-road autonomous vehicles switch at least some of the loads between themselves so as to pass the functional load from one of the on-road autonomous vehicles to another of the on-road autonomous vehicles.

FIG. 7D illustrates one embodiment of the convoy of several on-road autonomous vehicles 10*a*, 10*b*, 10*c*, 10*d* in which the on-road autonomous vehicles switch at least some of the loads between themselves so as to pass the functional load 11-func from one of the on-road autonomous vehicles 10*a* to another 10*b* of the on-road autonomous vehicles.

Figure 7E:
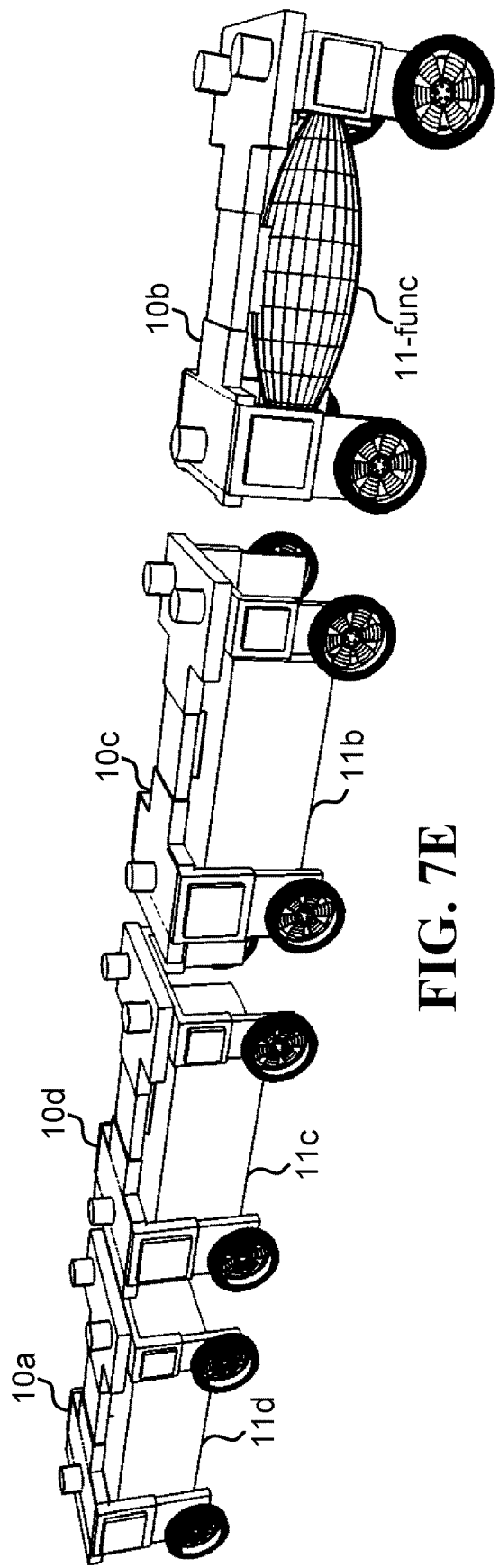
FIG. 7E illustrates one embodiment of the convoy of several on-road autonomous vehicles in which another of the on-road autonomous vehicles is now carrying the functional load.

FIG. 7E illustrates one embodiment of the convoy of several on-road autonomous vehicles 10*a*, 10*b*, 10*c*, 10*d* in which another of the on-road autonomous vehicles 10*b* is now carrying the functional load 11-func.

Figure 7F:
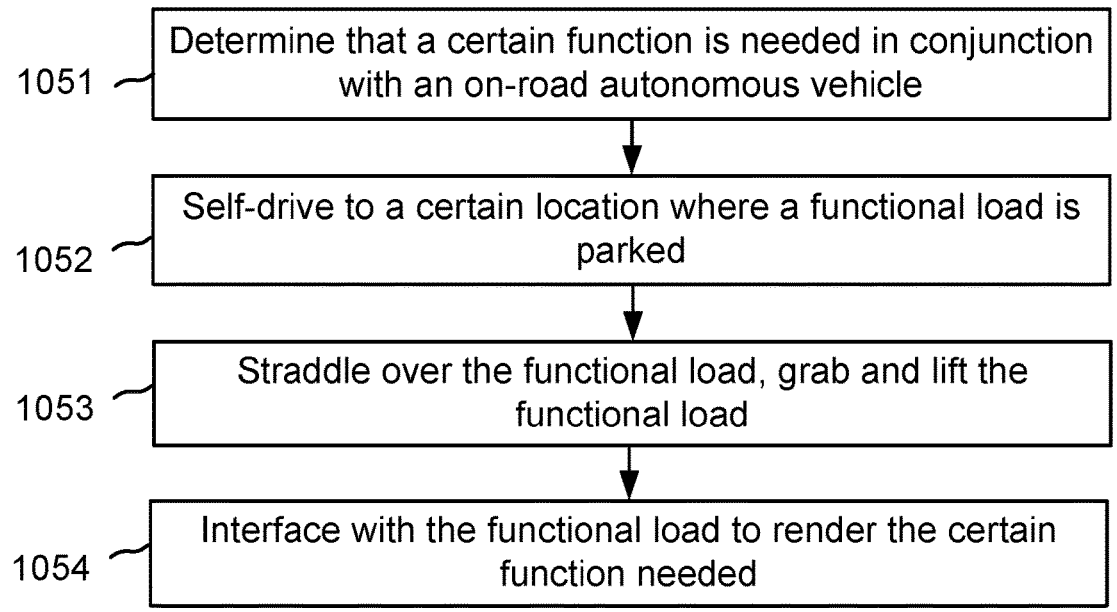
FIG. 7F illustrates one embodiment of a method for autonomously collecting and using a functional load.

FIG. 7F illustrates one embodiment of a method for autonomously collecting and using a functional load. In step 1051, determining, by an on-road autonomous vehicle 10 (FIG. 7A), that a certain function is needed in conjunction with operating said on-road autonomous vehicle. In step 1052, self-driving (FIG. 2A), by the on-road autonomous vehicle 10, from a current location of the on-road autonomous vehicle to a certain location 27 (FIG. 7A) where a functional load 11-func is parked, in which said functional load if operative to render said certain function needed. In step 1053, upon arrival to said certain location (FIG. 7A), straddling autonomously (FIG. 3B, and the transition from FIG. 3A to FIG. 3B), by the on-road autonomous vehicle 10, over the functional load 10-func, thereby allowing the on-road autonomous vehicle to grab (FIG. 3C) and lift autonomously (FIG. 3D, or the transition from FIG. 3C to FIG. 3D) the functional load 10-func above ground in a linear upward movement that creates a full clearance of the load above ground (the result is illustrated in FIG. 7B). In step 1054, interfacing 5-int (FIG. 7B), in a physical manner, between the on-road autonomous vehicle 10 and the functional load 11-func, thereby facilitating said rendering of the certain function needed from the functional load to the on-road autonomous vehicle.

In one embodiment, said certain function needed is a need to charge an electrical battery 12*a*, 12*c* (FIG. 7B) belonging to the on-road autonomous vehicle 10, said functional load 11-func is an energy source, and said interfacing 5-int is operative to transfer energy from the functional load 11-func to the on-road autonomous vehicle 10. In one embodiment, said energy source 11-func is a portable battery, and said interfacing 5-int is an electrical interface operative to transport electricity from the portable battery 11-func to the battery 12*a*, 12*c* of the on-road autonomous vehicle 10. In one embodiment, said energy source 11-func is a portable fuel cell, and said interfacing 5-int is an electrical interface operative to transport electricity from the fuel cell 11-func to the battery 12*a*, 12*c* of the on-road autonomous vehicle 10. In one embodiment, said energy source 11-func is a portable generator with on-board fuel, and said interfacing 5-int is an electrical interface operative to transport electricity from the portable generator 11-func to the battery 12*a*, 12*c* of the on-road autonomous vehicle 10.

In one embodiment, said certain function needed is a need for fuel, said functional load 11-func is a fuel tank, and said interfacing 5-int is operative to transfer fuel from the fuel tank 11-func to the on-road autonomous vehicle 10. In one embodiment, said fuel is gasoline or diesel fuel. In one embodiment, said fuel is a fuel operative to drive a fuel cell, such as hydrogen fuel, methanol fuel, ethanol fuel, or methane fuel.

Figure 7G:
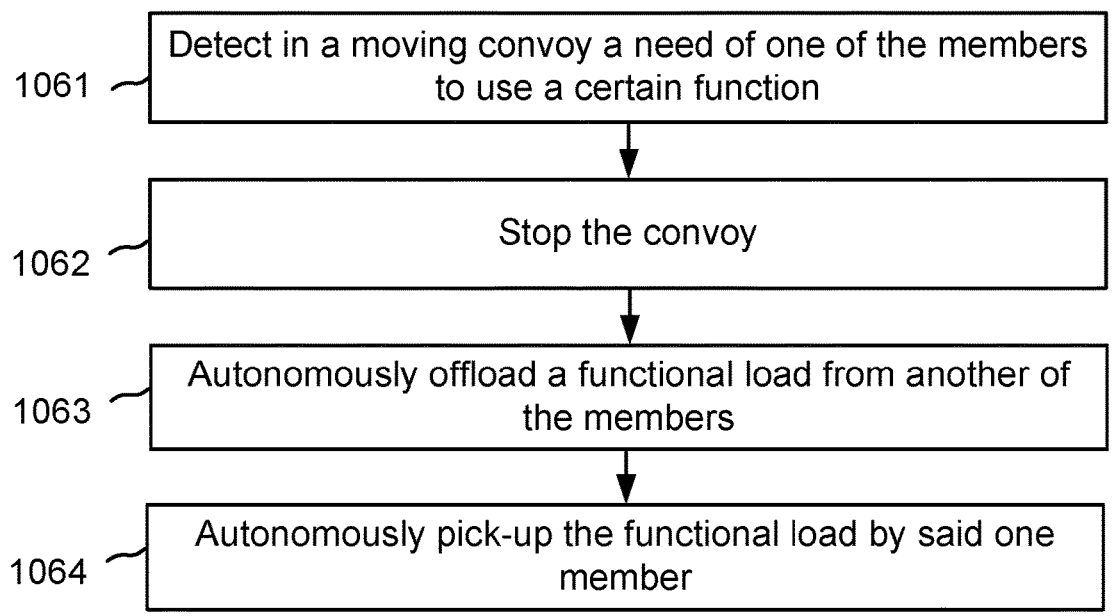
FIG. 7G illustrates one embodiment of a method for exchanging a functional load between at least two on-road autonomous vehicles in a convoy.

FIG. 7G illustrates one embodiment of a method for exchanging a functional load between at least two on-road autonomous vehicles in a convoy. In step 1061, detecting, in a moving convoy (FIG. 7C) comprising on-road autonomous vehicles 10*a*, 10*b*, 10*c*, 10*d*, a need of one of the on-road autonomous vehicles 10*b* in the convoy to use a certain function, and further detecting another on-road autonomous vehicle 10*a* in the moving convoy that currently makes use of said certain function in conjunction with a functional load 11-func carried therewith (i.e., 10*a* carries 11-func for a certain use, and 10*b* currently needs 11-func for that use). In step 1062, stopping the convoy (FIG. 7D) as a response to said detections. In step 1063, autonomously offloading, by said another on-road autonomous vehicle 10*a*, the functional load 11-func, thereby placing the functional load 11-func on ground (e.g., in FIG. 7D, 11-func has now been placed on ground, and 10*a* which previously carried 11-func has now moved to the back of the convoy). In step 1064, autonomously picking-up the functional load 11-func off ground and interfacing to said functional load by said one of the on-road autonomous vehicles 10*b* (e.g., FIG. 7E, 10*b* has now collected 11-func, and load 11*b* which was previously carried by 10*b* is now carried by yet another vehicle 10*c*), thereby facilitating said certain function in conjunction with said one of the on-road autonomous vehicles 10*b*.

Figure 10A:
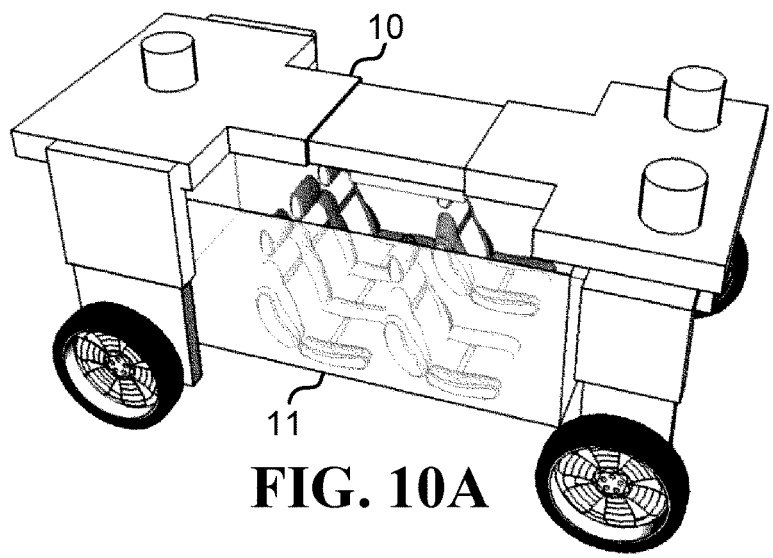
FIG. 10A illustrates one embodiment of an on-road autonomous vehicle carrying a passenger cabin.
Figure 10B:
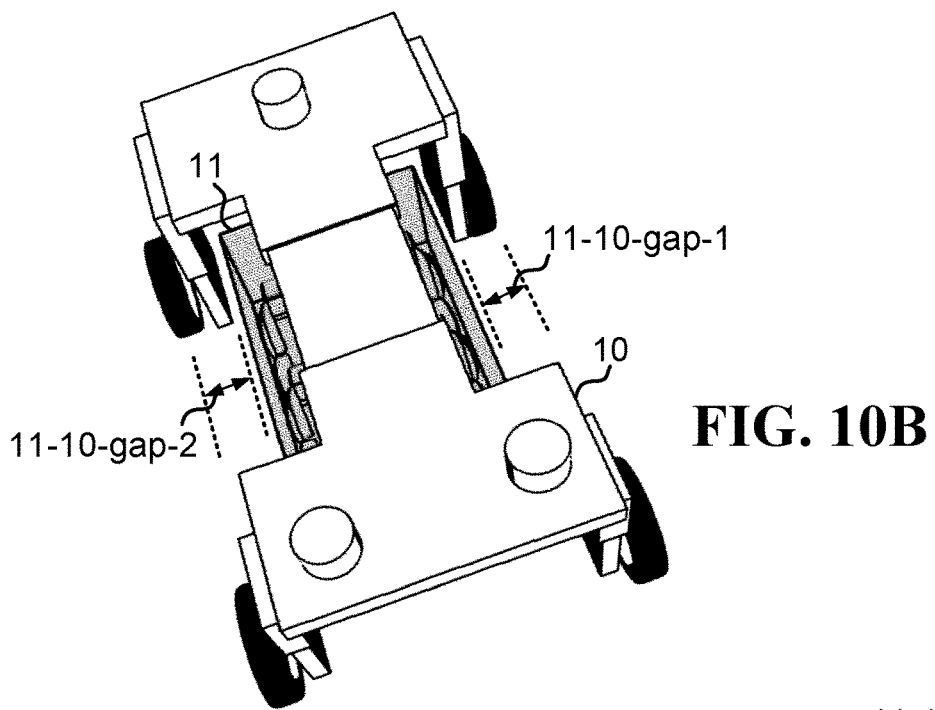
FIG. 10B illustrates one embodiment of the on-road autonomous vehicle providing air gap protection to the passenger cabin.

In one embodiment, said picking-up of the functional load 11-func, by said one of the on-road autonomous vehicles 11*b* (FIG. 7E), is facilitated by straddling autonomously, by said one of the on-road autonomous vehicle 11*b*, over the functional load 11-func now on ground (FIG. 7D, 10*b* is driving/straddling over 11-func), thereby allowing said one of the on-road autonomous vehicle 10*b* to grab and lift autonomously the functional load 11-func above ground in a linear upward movement that creates a full clearance of the functional load above ground (in FIG. 7E, 10*b* has lifted 11-func above ground), thereby facilitating said interfacing.

In one embodiment, said certain function is an electrical charging of batteries 12*a*, 12*c* belonging to said one of the on-road autonomous vehicles 10*b*, in which said functional load 11-func in an energy source.

One embodiment further comprising resuming movement by the convoy.

Figure 8A:
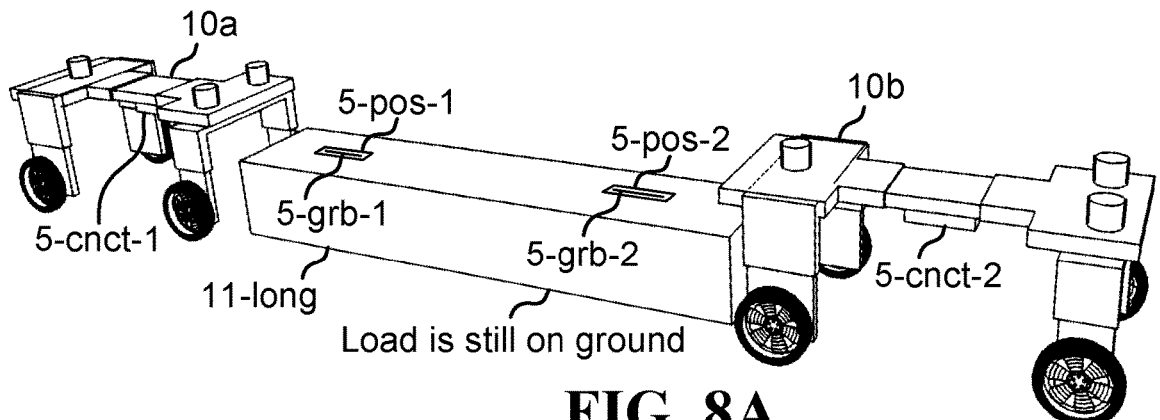
FIG. 8A illustrates one embodiment of two on-road autonomous vehicles getting into positions in conjunction with a load that is too big to be carried by only one on-road autonomous vehicle.

FIG. 8A illustrates one embodiment of two on-road autonomous vehicles 10*a*, 10*b* getting into positions in conjunction with a load 11-long that is too big to be carried by only one on-road autonomous vehicle. 5-cnct-1 is a connector of on-road autonomous vehicles 10*a* and is operative to grab a grabbing point 5-grb-1 of load 11-long at position 5-pos-1. 5-cnct-2 is a connector of on-road autonomous vehicles 10*b* and is operative to grab a grabbing point 5-grb-2 of load 11-long at position 5-pos-2.

Figure 8B:
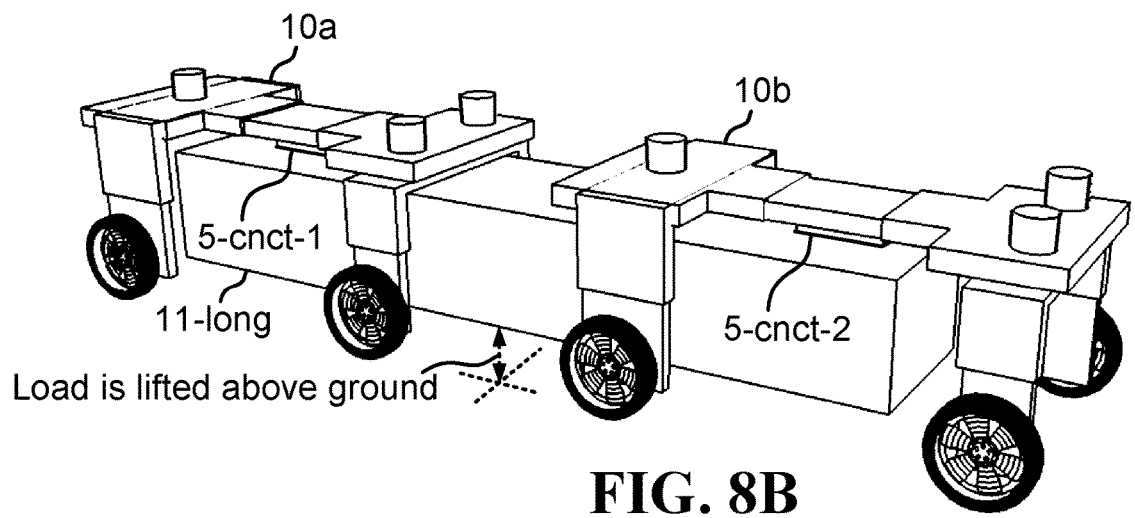
FIG. 8B illustrates one embodiment of the two on-road autonomous vehicles cooperatively lifting the load.

FIG. 8B illustrates one embodiment of the two on-road autonomous vehicles 10*a*, 10*b* cooperatively lifting the load 11-long.

Figure 8C:
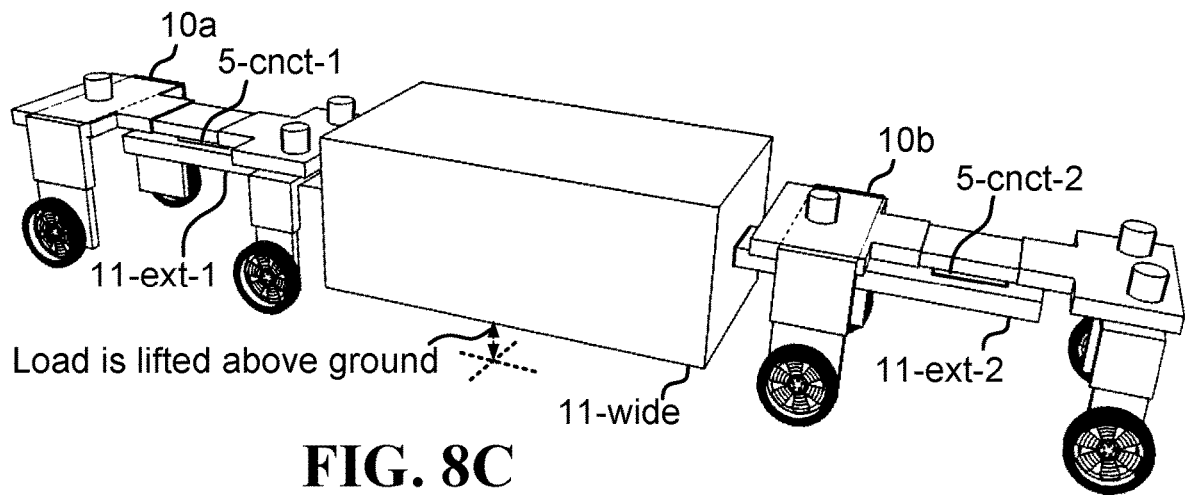
FIG. 8C illustrates one embodiment of the two on-road autonomous vehicles cooperatively lifting another load.

FIG. 8C illustrates one embodiment of the two on-road autonomous vehicles 10*a*, 10*b* cooperatively lifting another load 11-wide. 11-ext-1 and 11-ext-2 are extensions of load 11-wide.

Figure 8D:
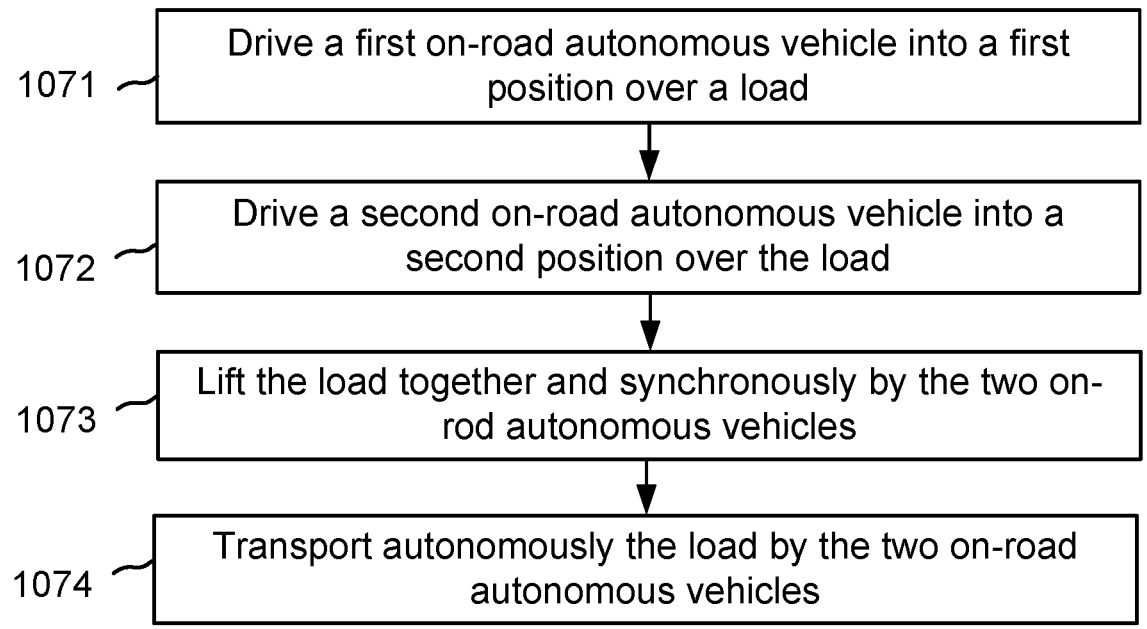
FIG. 8D illustrates one embodiment of a method for cooperatively lifting and transporting a load by at least two on-road autonomous vehicles.

FIG. 8D illustrates one embodiment of a method for cooperatively lifting and transporting a load by at least two on-road autonomous vehicles. In step 1071, driving autonomously, by a first on-road autonomous vehicle 10*a* (FIG. 8A), into a first predetermined position 5-pos-1 over a load 11-long (FIG. 8A), in which the first predetermined position 5-pos-1 is associated with a first grabbing point 5-grb-1 in the load 11-long. In step 1072, driving autonomously, by a second on-road autonomous vehicle 10*b* (FIG. 8A), into a second predetermined position 5-pos-2 over the load 11-long, in which the second predetermined position 5-pos-2 is associated with a second grabbing point 5-grb-2 in the load 11-long. In step 1073, lifting the load 11-long together and synchronously (FIG. 8B), by the first and the second on-road autonomous vehicles 10*a*, 10*b* in conjunction respectively with the first and second grabbing points 5-grb-1, 5-grb-2, such that: (i) the load 11-long is lifted above ground, (ii) the load 11-long achieves full clearance above ground, and (iii) a weight of the load 11-long is spread between the first 10*a* and second 10*b* on-road autonomous vehicles via the first 5-grb-1 and second 5-grb-2 grabbing points respectively. In step 1074, transporting autonomously the load 11-long together and synchronously by the first and second on-road autonomous vehicles 10*a*, 10*b*, such that the load 11-long maintains said full clearance above ground during transport.

In one embodiment, the first on-road autonomous vehicle 10*a* constantly communicates with the second 10*b* on-road autonomous vehicle during said lifting and transport in order to achieve said synchronicity. In one embodiment, the first on-road autonomous vehicle 10*a* controls the second on-road autonomous vehicle 10*b* during said lifting and transport, thereby facilitating the lifting and transport autonomously. In one embodiment, the first on-road autonomous vehicle 10*a* receives sensory input from the second on-road autonomous vehicle 10*b* during said lifting and transport, thereby facilitating the lifting and transport autonomously.

In one embodiment, said driving autonomously comprises straddling autonomously over the load, by said first and second on-road autonomous vehicles 10*a*, 10*b*.

In one embodiment, said lifting comprises: lowering a first connector 5-cnct-1 of the first on-road autonomous vehicle 10*a* into mechanical contact with the first grabbing point 5-grb-1, lowering a second connector 5-cnct-2 of the second on-road autonomous 10*b* vehicle into mechanical contact with the second grabbing point 5-grb-2, grabbing the first grabbing point 5-grb-1 by the first connector 5-cnct-1, grabbing the second grabbing point 5-grb-2 by the second connector 5-cnct-2, and raising synchronously the first and second connectors 5-cnct-1, 5-cnct-2 respectively by the first and second on-road autonomous vehicles 10*a*, 10*b*.

In one embodiment, the load 11-long (FIG. 8A, FIG. 8B) is narrower than the on-road autonomous vehicles 10*a*, 10*b*, thereby enabling the entire load to be carried under the on-road autonomous vehicles.

In one embodiment, the load 11-wide (FIG. 8C) is wider than the on-road autonomous vehicles 10*a*, 10*b*, thereby requiring the load to be supported under the on-road autonomous vehicles by two narrow extension shafts 11-ext-1, 11-ext-2 (FIG. 8C).

Figure 9A:
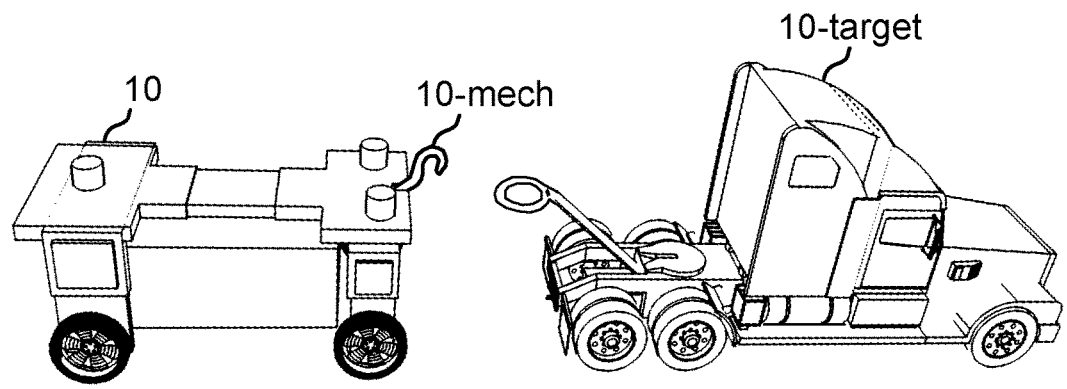
FIG. 9A illustrates one embodiment of an on-road autonomous vehicle getting into position behind a target vehicle.

FIG. 9A illustrates one embodiment of an on-road autonomous vehicle 10 getting into position behind a target vehicle 10-target. 10-mech is a mechanical hook or grabbing mechanism.

Figure 9B:
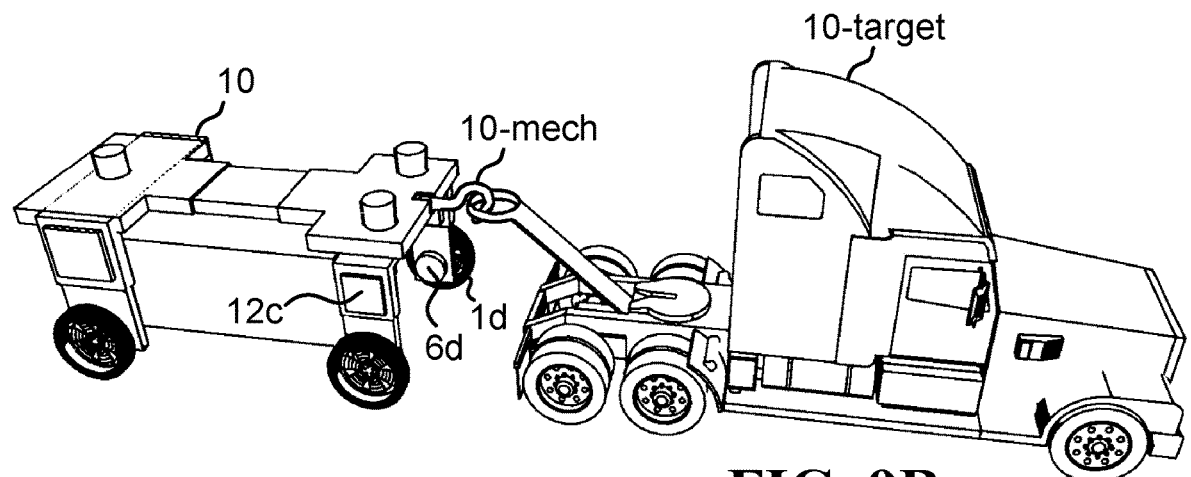
FIG. 9B illustrates one embodiment of the on-road autonomous vehicle now mechanically connected to the target vehicle that pulls the on-road autonomous vehicle thereby allowing for self generation of electrical energy in the on-road autonomous vehicle.

FIG. 9B illustrates one embodiment of the on-road autonomous vehicle 10 now mechanically connected via the mechanical hook or grabbing mechanism 10-mech to the target vehicle 10-target. The target vehicle 10-target pulls the on-road autonomous vehicle thereby allowing the on-road autonomous vehicle to self generate electrical energy.

Figure 9C:
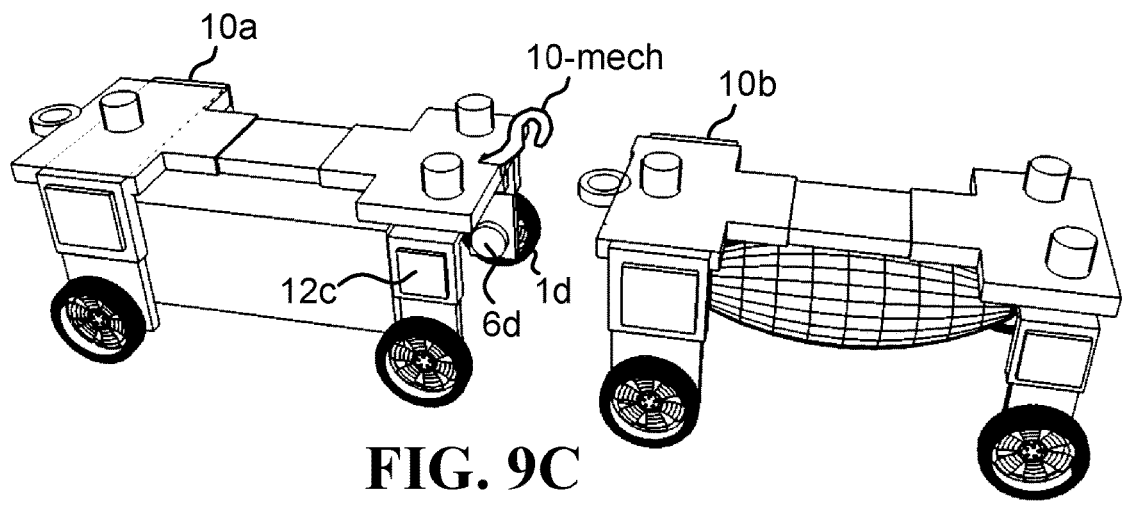
FIG. 9C illustrates one embodiment of an on-road autonomous vehicle getting into position behind another on-road autonomous vehicle in order to be pulled thereby.

FIG. 9C illustrates one embodiment of an on-road autonomous vehicle 10*a* getting into position behind another on-road autonomous vehicle 10*b* in order to be pulled thereby.

Figure 9D:
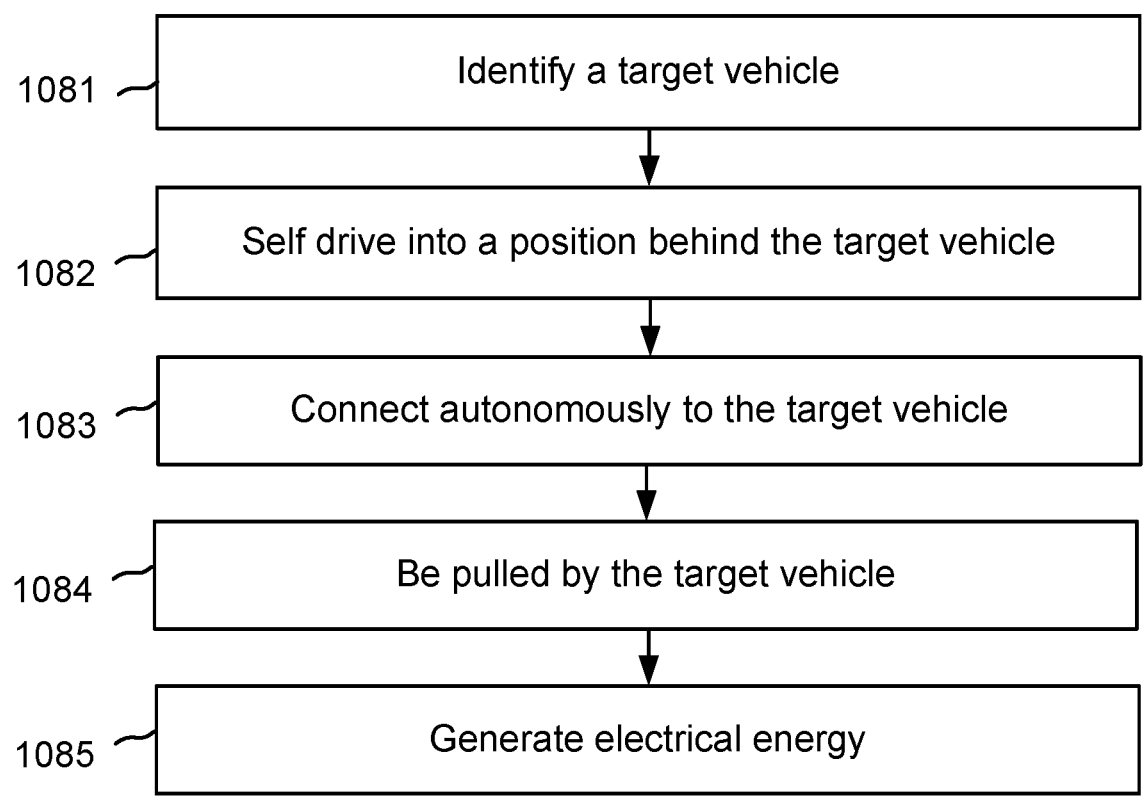
FIG. 9D illustrates one embodiment of a method for charging batteries of an on-road autonomous vehicle on the move.

FIG. 9D illustrates one embodiment of a method for charging batteries of an on-road autonomous vehicle on the move. In step 1081, identifying, by an on-road autonomous vehicle 10 (FIG. 9A), a target vehicle 10-target (FIG. 9A) operative to mechanically pull another vehicle. In step 1082, self driving (FIG. 2A), by the on-road autonomous vehicle 10, into a position behind the target vehicle identified (FIG. 9A). In step 1083, connecting autonomously (FIG. 9B), by the on-road autonomous vehicle 10, to the target vehicle 10-target, by performing an autonomous maneuver in conjunction with a mechanical hook or grabbing mechanism 10-mech, so as to mechanically connect between the on-road autonomous vehicle 10 and the target vehicle 10-target (FIG. 9B). In step 1084, being pulled, by the target vehicle 10-target, thereby causing at least one wheel 1*d* (FIG. 9B) of the on-road autonomous vehicle 10 to rotate as the on-road autonomous vehicle 10 is pulled by the target vehicle 10-target. In step 1085, generating electrical energy from at least one dynamo 6*d* (FIG. 9B) connected to the at least one wheel 1*d* now rotating, thereby allowing the dynamo 6*d* to charge a battery 12*c* of the on-road autonomous vehicle 10.

In one embodiment, said connecting autonomously is done during forward movement of both the on-road autonomous vehicle 10 and the target vehicle 10-target.

In one embodiment, said connecting autonomously is done in a stationary state, before forward movement of both the on-road autonomous vehicle 10 and the target vehicle 10-target, in which said forward movement by the target vehicle causes said pulling.

In one embodiment, said mechanical hook or grabbing mechanism 10-mech is a part of the on-road autonomous vehicle 10. In one embodiment, the hook or grabbing mechanism 10-mech is a moving hook. In one embodiment, the hook or grabbing mechanism 10-mech is a mechanical connector.

In one embodiment, the target vehicle 10-target is a second on-road autonomous vehicle 10*b* (FIG. 9C), in which the second on-road autonomous vehicle 10*b* synchronizes said autonomous connection with the on-road autonomous vehicle 10 or 10*a*. In one embodiment, said self driving, by the on-road autonomous vehicle 10 or 10*a*, into a position behind the target vehicle 10-target, is done in conjunction with the second on-road autonomous vehicle 10*b*, 10-target also self driving into a position in front of the on-road autonomous vehicle 10 or 10*a*.

In one embodiment, the dynamo 6*d* is an electrical engine of the on-road autonomous vehicle 10, in which the electrical engine is operated in a breaking mode, thereby facilitating said generation of electrical energy.

In one embodiment, said identification is done so as to identify the target vehicle 10-target as a vehicle currently traveling in a direction similar to a direction desirable by the on-road autonomous vehicle 10.

FIG. 10A illustrates one embodiment of an on-road autonomous vehicle 10 carrying a passenger cabin 11.

FIG. 10B illustrates one embodiment of the on-road autonomous vehicle 10 providing air gap protection 11-10-gap-1, 11-10-gap-2 to the passenger cabin 11.

Figure 10C:
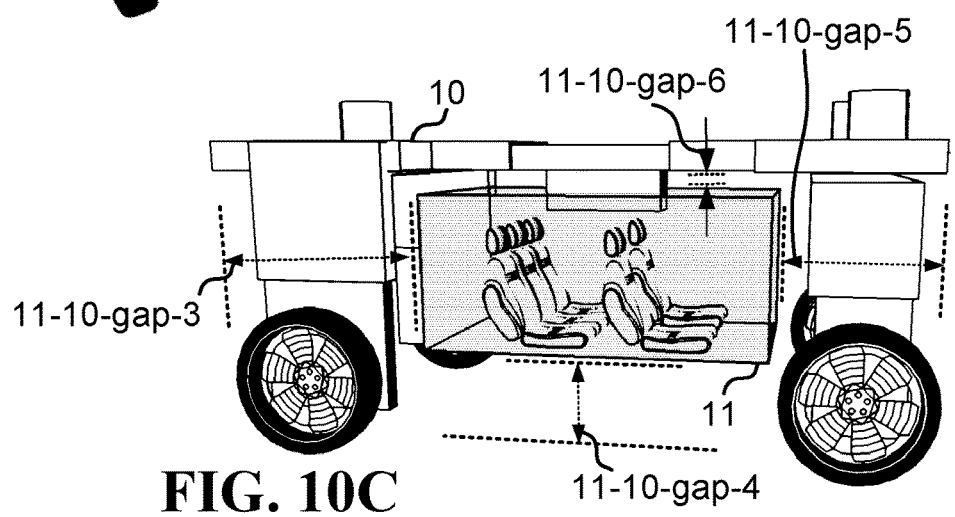
FIG. 10C illustrates one embodiment of the on-road autonomous vehicle providing further air gap protection to the passenger cabin.

FIG. 10C illustrates one embodiment of the on-road autonomous vehicle 10 providing further air gap protection 11-10-gap-3, 11-10-gap-4, 11-10-gap-5, 11-10-gap-6 to the passenger cabin 11.

One embodiment is a system operative to provide a hybrid air-gap and mechanical protection for a passenger cabin. The system includes a passenger cabin 11 (FIG. 10A), and an on-road autonomous vehicle 10 (FIG. 10A) operative to straddle over a passenger cabin 11 and then to pick up the passenger cabin 11, such that the passenger cabin 11 is carried underneath the on-road autonomous vehicle 10 (FIG. 10A). The on-road autonomous vehicle 10 is operative to mechanically enclose the passenger cabin 11 from at least 4 (four) directions, such as to provide mechanical protection from impact with foreign objects, in which said mechanical protection is enhanced by maintaining air-gaps 11-10-gap-1,2,3,4,5,6 between the on-road autonomous vehicle 10 and the passenger cabin 11 in conjunction with the at least 4 (four) directions.

In one embodiment, said at least 4 (four) directions are front, rear, left, and right, in which the front direction is associated with one of the air-gaps 10-11-gap-5 (FIG. 10C) located in front of the passenger cabin 11, the rear direction is associated with one of the air-gaps 10-11-gap-3 (FIG. 10C) located behind the passenger cabin 11, the left direction is associated with one of the air-gaps 10-11-gap-1 (FIG. 10B) located to the left of the passenger cabin 11, and the right direction is associated with one of the air-gaps 10-11-gap-2 (FIG. 10B) located to the right of the passenger cabin 11. In one embodiment, said at least 4 (four) directions are at least 5 (five) directions comprising also an up direction associated with one of the air-gaps 10-11-gap-6 (FIG. 10C) located above the passenger cabin 11. In one embodiment, said at least 5 (five) directions are 6 (directions) directions comprising also a down direction associated with one of the air-gaps 10-11-gap-4 (FIG. 10C) located below the passenger cabin 11.

Figure 11A:
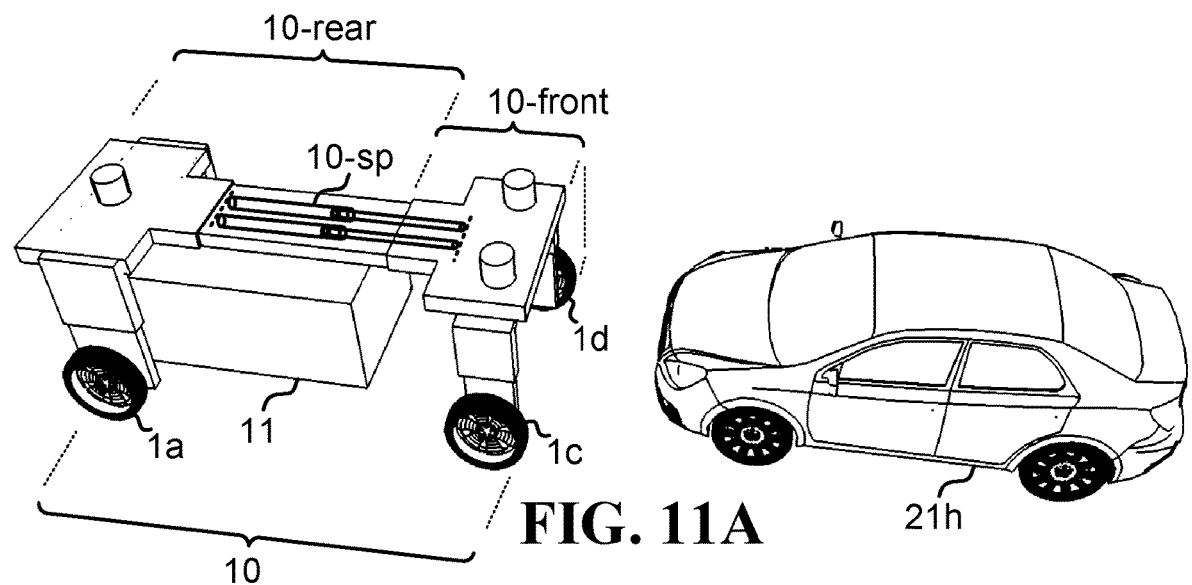
FIG. 11A illustrates one embodiment of an on-road autonomous vehicle about to be hit by a foreign object.

FIG. 11A illustrates one embodiment of an on-road autonomous vehicle 10 about to be hit by a foreign object 21. The on-road autonomous vehicle 10 comprises a rear section 10-rear, a front section 10-front, and a piston or spring 10-*sp*.

Figure 11B:
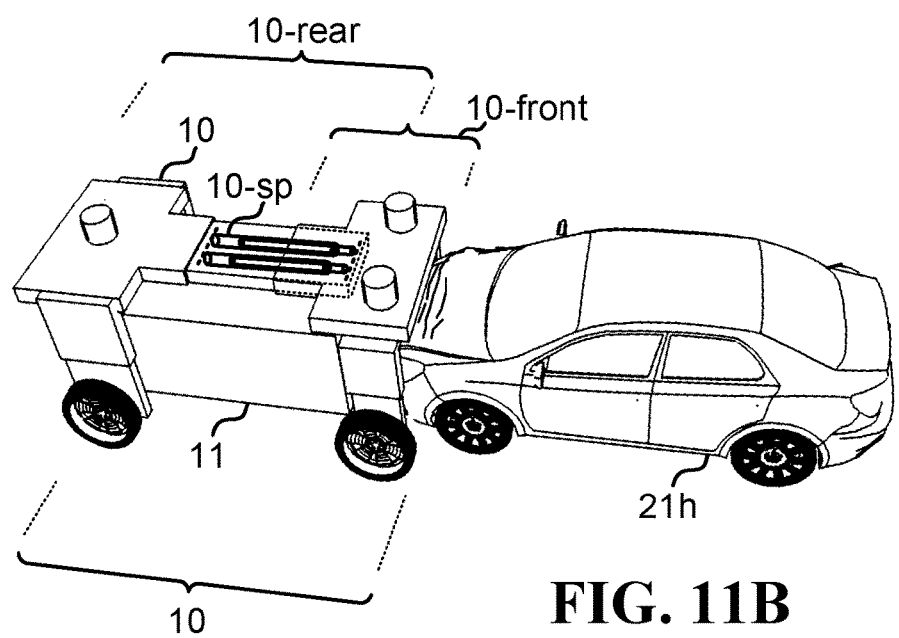
FIG. 11B illustrates one embodiment of the on-road autonomous vehicle being hit by the foreign object.

FIG. 11B illustrates one embodiment of the on-road autonomous vehicle 10 being hit by the foreign object 21*h*.

One embodiment is a system operative to protect an on-road vehicle from impact with foreign objects. The system includes a front section 10-front (FIG. 11A) of an on-road vehicle 10 (FIG. 11A), in which the front section comprises two front wheels 1*c*, 1*d* on which the on-road vehicle is supported. The system further includes a rear section 10-rear (FIG. 11A) of the on-road vehicle 10, in which the rear section comprises two rear wheels 1*a*, 1*b* on which the on-road vehicle is further supported, and in which the front section 10-front is mechanically connected to the rear section 10-rear so as to allow movement of the entire front section 10-front relative to the rear sections 10-rear. The system further includes a passenger or cargo cabin 11 of the on-road vehicle 10, in which the passenger or cargo cabin is mechanically connected to the rear section 10-rear without touching the front section 10-front. The system further includes a linear horizontal actuator or horizontal spring 10-*sp* (FIG. 11A) having two sides, in which the linear horizontal actuator or horizontal spring is mechanically connected to the front section 10-front on one side and to the rear section 10-rear on the other side, and in which the linear horizontal actuator or horizontal spring 10-*sp* is operative to generate a reaction force pushing the front section 10-front away from the rear section 10-rear when the front section moves toward the rear section. During a collision of the front section 10-front with a foreign object 21*h* (FIG. 11B), the front section 10-front moves toward the rear section 10-rear (FIG. 11B), thereby causing said reaction force to accelerate the rear section 10-rear away from the foreign object 21*h*, and thereby avoiding a collision between the passenger or cargo cabin 11 and the foreign object 21*h* or at least reducing a relative velocity between the passenger or cargo cabin 11 and the foreign object 21*h*. In one embodiment, the linear horizontal actuator or horizontal spring is a piston.

One embodiment is an on-road vehicle operative to control a length thereof. The an on-road vehicle includes a front section 10-front (FIG. 11A) of the on-road vehicle 10 (FIG. 11A), in which the front section comprises two front wheels 1*c*, 1*d* on which the on-road vehicle is supported. The on-road vehicle further includes a rear section 10-rear (FIG. 11A) of the on-road vehicle 10, in which the rear section comprises two rear wheels 1*a*, 1*b* on which the on-road vehicle is further supported, and in which the front section 10-front is mechanically connected to the rear section 10-rear so as to allow movement of the entire front section 10-front relative to the rear sections 10-rear. The on-road vehicle further includes a linear horizontal actuator or a piston 10-*sp* (FIG. 11A) having two sides, in which the linear horizontal actuator or piston is mechanically connected to the front section 10-front on one side and to the rear section 10-rear on the other side, and in which the linear horizontal actuator or piston 10-*sp* is operative to adjust a distance between the front section 10-front and the rear section 10-rear so as to control a length of the on-road vehicle.

In one embodiment, said length is adjusted to support loads 11 of different lengths to be carried by the on-road vehicle.

In one embodiment, said length is adjusted to support compact length during parking of the on-road vehicle 10.

In one embodiment, said length is adjusted to support extended length during high speed driving of the on-road vehicle 10 in order to protect a load 11 carried by the on-road vehicle by increasing an air-gap 11-10-gap-5 (FIG. 10C) between the load 11 the front section 10-front.

FIG. 12A illustrates one embodiment of an on-road autonomous vehicle 10 carrying a load 11 having a certain aerodynamic design and extending beyond a length of the on-road autonomous vehicle.

One embodiment is a combined vehicle-and-load arrangement operative to reduce drag on the vehicle. The combined vehicle-and-load arrangement includes an on-road autonomous vehicle 10 (FIG. 12A) having a first aerodynamic drag coefficient and a load 11 (FIG. 12A) having a certain aerodynamic design. The on-road autonomous vehicle 10 is configured to straddle autonomously over the load 11, thereby allowing the on-road autonomous vehicle 10 to grab and lift autonomously the load 11 above ground in a linear upward movement that creates a full clearance of the load above ground. The combined vehicle-and-load arrangement 10+11 of the on-road autonomous vehicle together with the load now lifted is operative to reduce the first aerodynamic drag coefficient of the on-road autonomous vehicle.

Figure 12B:
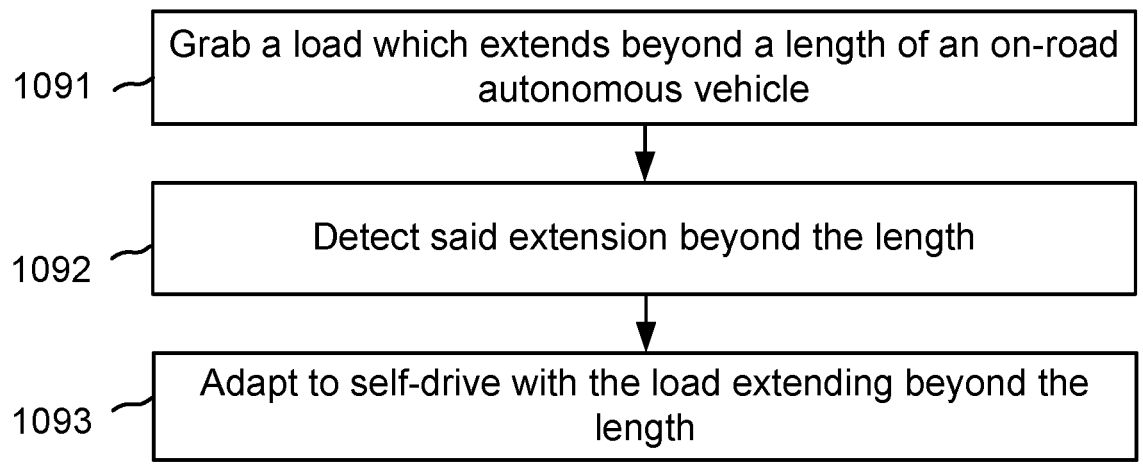
FIG. 12B illustrates one embodiment of a method for adjusting an on-road autonomous vehicle to carry a long load.

FIG. 12B illustrates one embodiment of a method for adjusting an on-road autonomous vehicle to carry a long load. In step 1091, straddling autonomously, by an on-road autonomous vehicle 10 having a certain length 10-L (FIG. 12), over a load 11 having a greater length 11-L (FIG. 12), thereby allowing the on-road autonomous vehicle 10 to grab and lift autonomously the load 11 above ground in a linear upward movement that creates a full clearance of the load above ground, and resulting in the load 11 extending beyond said certain length 10-L. In step 1092, detecting, by sensors 4*a*, 4*b*, 4*c* (FIG. 12) belonging to the on-road autonomous vehicle 10, said extension of the load 11 beyond said certain length 10-L. In step 1093, altering, according to said detection, at least a first parameter in conjunction with an autonomous driving procedure of the on-road autonomous vehicle, thereby adapting the on-road autonomous vehicle 10 to self-drive with the load 11 extending beyond said certain length 10-L.

In one embodiment, the first parameter is an effective length of the on-road autonomous vehicle, in which said effective length is increased from the certain length 10-L to the greater length 11-L.

One embodiment is a system operative to autonomously collect and transport a passenger 30 in a cabin 11 (FIG. 5C), comprising: an autonomous on-road vehicle 10 operative to straddle over (FIG. 3B, and the transition from FIG. 3A to FIG. 3B) loads 11 such as cabins operative to contain passengers 30 (FIG. 5C); and a cabin 11 operative to contain passengers 30 (FIG. 5B), in which the cabin 11 is currently located at a certain parking location without any passengers inside (the cabin 11 as shown in FIG. 5B, but without the passenger 30 inside); wherein, the system is configured to: receive a request to collect-and-transport a passenger 30 which is currently located or is soon-to-be-located in a pick-up location; self-drive, as a response to said request, the on-road autonomous vehicle 10, to said certain parking location; upon arrival of the on-road autonomous vehicle 10 to said certain parking location: straddle autonomously (FIG. 3B, and the transition from FIG. 3A to FIG. 3B), the on-road autonomous vehicle 10, over the cabin 11, thereby allowing the on-road autonomous vehicle 10 to grab and lift autonomously (the transition between FIG. 3C and FIG. 3D) the cabin 11; self-drive the on-road autonomous vehicle 10 to said pick-up location, while the cabin 11 is hanging underneath the on-road autonomous vehicle; and pick-up the passenger 30 (FIG. 5C) at the pick-up location.

One embodiment is a system operative to transport passengers in a cabin and also transport cargo loads, comprising: an autonomous on-road vehicle 10 operative to straddle over (FIG. 3A, FIG. 3B) loads 11 such as cabins operative to contain passengers and such as cargo loads; a cabin 11 operative to contain passengers 30 (FIG. 5C), in which the cabin is currently located at a certain parking location; and a cargo load 11 (FIG. 2C); wherein, the system is configured to: autonomously transport the cargo load 11 (FIG. 4B), using the autonomous on-road vehicle 10, to a certain location; autonomously release the cargo load 11 at the certain location (the transition from FIG. 3D to FIG. 3C to FIG. 3B and to FIG. 3A); self-drive the on-road autonomous vehicle 10 (FIG. 2A), which is now free of the cargo load, to the certain parking location; upon arrival of the on-road autonomous vehicle 10 to said certain parking location: straddle autonomously, the on-road autonomous vehicle, over the cabin, thereby allowing the on-road autonomous vehicle to grab and lift autonomously the cabin; self-drive the on-road autonomous vehicle to a pick-up location, while the cabin is hanging underneath the on-road autonomous vehicle; and pick-up a passenger at the pick-up location (FIG. 5C) into the cabin.

One embodiment is a system operative to transport both passengers in a towed cabin and towed cargo loads, comprising: an autonomous on-road vehicle operative to tow loads such as towed cabins operative to contain passengers and such as towed cargo loads; a towed cabin operative to contain passengers, in which the towed cabin is currently located at a certain parking location; and a towed cargo load; wherein, the system is configured to: autonomously transport the towed cargo load, using the autonomous on-road vehicle, to a certain location; autonomously release the towed cargo load at the certain location; self-drive the on-road autonomous vehicle, which is now free of the towed cargo load, to the certain parking location; upon arrival of the on-road autonomous vehicle to said certain parking location: connect the towed cabin, thereby allowing the on-road autonomous vehicle to autonomously tow the towed cabin; self-drive the on-road autonomous vehicle to a pick-up location, while the towed cabin is hanging behind the on-road autonomous vehicle; and pick-up a passenger at the pick-up location into the cabin.

FIG. 13A illustrates one embodiment of an on-road autonomous vehicle 10 currently integrated with a first object 11-obj-1 having drawers 11-drawer that are presently closed. The drawers 11-drawer may contain packages to be delivered or other items to be delivered and/or stored. The on-road autonomous vehicle 10 is operative to self-integrate with the first object 11-obj-1, thereby creating a first resultant vehicle 10+11-obj-1 that is the combination of both the autonomous vehicle 10 and the first object 11-obj-1 and that has a first specific purpose, in which such a first specific purpose may be the delivery of packages. For example, the first resultant vehicle 10+11-obj-1 may self drive to a logistics center, load the drawers 11-drawer with packages, and then self-drive with the packages onboard to several delivery destinations, in which each of the drawers 11-drawer gets open as the resultant vehicle 10+11-obj-1 arrives at the designated delivery destination, and the respective package is then picked up, perhaps by a certain person who ordered the respective package. Self integration of on-road autonomous vehicle 10 with the first object 11-obj-1 facilitates the first specific purpose of package delivery by: (i) combining the features of both the on-road autonomous vehicle 10 and the first object 11-obj-1 in creation of a combined set of features that facilitates self package delivery, and (ii) maintaining cooperation/communication between the on-road autonomous vehicle 10 and the first object 11-obj-1 during the different phases of package delivery. For example, self-driving the first resultant vehicle 10+11-obj-1 to the logistics center is based on sensors (e.g., 4a, 4b, 4c, FIG. 1A) and self-driving directives embedded in the on-road autonomous vehicle 10, but loading packages into the drawers 11-drawer requires further cooperation and communication with the first object 11-obj-1, for example when the sensors onboard the on-road autonomous vehicle 10 conclude that the first resultant vehicle 10+11-obj-1 is in the correct loading spot in the logistics center and consequently the on-road autonomous vehicle 10 instructs the first object 11-obj-1 to open all drawers 11-drawer thereby allowing the loading of packages into the first object 11-obj-1. When the drawers 11-drawer are loaded with packages, the first resultant vehicle 10+11-obj-1 again uses sensors and directives embedded in the on-road autonomous vehicle 10 to self drive to several delivery locations. Upon arrival to a certain delivery location, the sensors 4a, 4b, 4c onboard on-road autonomous vehicle 10 can be used again to identify a specific person to whom one of the packages is intended, and the on-road autonomous vehicle 10 can then order a particular one of the drawers 11-drawer in the first object 11-obj-1 to open up and allow this person access to the respective package. As is evident from the above example, a synergy is created between the on-road autonomous vehicle 10 and the first object 11-obj-1, in which such a synergy is the result of a deep integration between the on-road autonomous vehicle 10 and the first object 11-obj-1, which now operate together as a synchronized and managed single resultant vehicle 10+11-obj-1. It is noted that after said self integration of (i.e., deep integration between) the on-road autonomous vehicle 10 and the first object 11-obj-1, the resultant vehicle 10+11-obj-1 has a resultant specific outer shape, for example by now including drawers 11-drawer that are accessible to people standing alongside the resultant vehicle 10+11-obj-1, in which such a resultant specific outer shape is critical for achieving the first specific purpose of package delivery. In one embodiment, an interface 5-int-1 is included in the on-road autonomous vehicle 10, in which maintaining the cooperation and communication between the on-road autonomous vehicle 10 and the first object 11-obj-1 is done via such interface. The interface 5-int-1 may support power transfer, such as electricity, from the on-road autonomous vehicle 10 to the first object 11-obj-1 and vice versa, and may further support data communication between the two, in which commands can be relayed trough such interface and sensory data can be shared. In one embodiment, the self integration of the on-road autonomous vehicle 10 with the first object 11-obj-1 is achieved via a straddling process, in which the on-road autonomous vehicle 10 straddles over the first object 11-obj-1, lowers itself or a connector thereof 5-cnct, grabs the first object 11-obj-1, and lifts the first object 11-obj-1, as described by the sequence shown in FIG. 3A, FIG. 3B. FIG. 3C, FIG. 3D, and in which the first object 11-obj-1 is represented by the label 11.

FIG. 13B illustrates one embodiment of the on-road autonomous vehicle 10 still integrated with the first object 11-obj-1 and getting one of the drawers 11-drawer opened, perhaps for loading or unloading a package into the drawer 11-drawer.

FIG. 14A illustrates one embodiment of an on-road autonomous vehicle 10 currently integrated with a second object 11-obj-2 having a door 11-door that is presently closed. The door 11-door may allow passengers to get in and out of object 11-obj-2, which may be a passenger cabin. The on-road autonomous vehicle 10 is operative to self-integrate with the second object 11-obj-2, thereby creating a second resultant vehicle 10+11-obj-2 that is the combination of both the autonomous vehicle 10 and the second object 11-obj-2 and that has a second specific purpose, in which such a second specific purpose may be transporting passengers in conjunction with a taxi service. For example, the second resultant vehicle 10+11-obj-2 may self drive to a pick-up destination, in which the door 11-door gets open as the second resultant vehicle 10+11-obj-2 arrives at the pick-up destination, and a passenger can then get into the passenger cabin 11-obj-2. Self integration of on-road autonomous vehicle 10 with the second object 11-obj-2 facilitates the second specific purpose of transporting passengers by: (i) combining the features of both the on-road autonomous vehicle 10 and the second object 11-obj-2 in creation of a combined set of features that facilitates self transporting of passengers, and (ii) maintaining cooperation/communication between the on-road autonomous vehicle 10 and the second object 11-obj-2 during the different phases of transporting passengers. For example, self-driving the second resultant vehicle 10+11-obj-2 to the pick-up location is based on sensors (e.g., 4a, 4b, 4c, FIG. 1A) and self-driving directives embedded in the on-road autonomous vehicle 10, but letting a passenger get onboard the passenger cabin 11-obj-2 by opening the door 11-door requires further cooperation and communication with the second object 11-obj-2, for example when the sensors onboard the on-road autonomous vehicle 10 conclude that the second resultant vehicle 10+11-obj-2 is in the correct address and further recognizes the passenger to be picked-up, then consequently the on-road autonomous vehicle 10 instructs the second object 11-obj-2 to open the door 11-door thereby allowing the recognized passenger in. As is evident from the above example, a different synergy is created between the on-road autonomous vehicle 10 and the second object 11-obj-2 (as compared to the synergy created with the first object 11-obj-1), in which such a different synergy is the result of a deep integration between the on-road autonomous vehicle 10 and the second object 11-obj-2, which now operate together as a differently synchronized and managed single second resultant vehicle 10+11-obj-2. It is noted that after said self integration of the on-road autonomous vehicle 10 and the second object 11-obj-2, the second resultant vehicle 10+11-obj-2 has a second resultant specific outer shape (as compared to the first resultant outer shape in conjunction with the first object 11-obj-1), for example by now including a door 11-door that is located at the right height allowing passengers in the resultant second vehicle 10+11-obj-2, in which such a second resultant specific outer shape is critical for achieving the second specific purpose of transporting passengers. In one embodiment, the self integration of the on-road autonomous vehicle 10 with the second object 11-obj-2 is achieved via a straddling process, in which the on-road autonomous vehicle 10 straddles over the second object 11-obj-2, lowers itself or a connector thereof 5-cnct, grabs the second object 11-obj-2, and lifts the second object 11-obj-2, as described by the sequence shown in FIG. 3A, FIG. 3B. FIG. 3C, FIG. 3D, and in which the second object 11-obj-2 is represented by the label 11. In one embodiment, the self integration of the on-road autonomous vehicle 10 with the second object 11-obj-2 is done after de-integrating the on-road autonomous vehicle 10 with the first object 11-obj-1, which may be achieved autonomously using a straddling-off process, in which the on-road autonomous vehicle 10 lowers the second object 11-obj-2, and straddles off the second object 11-obj-2, as can be visualized by "playing in reverse" the sequence shown in FIG. 3A, FIG. 3B. FIG. 3C, FIG. 3D, i.e., starting from FIG. 3D and ending with FIG. 3A.

FIG. 14B illustrates one embodiment of the on-road autonomous vehicle 10 still integrated with the second object 11-obj-2 and getting the door 11-door opened, perhaps for letting passengers get into and out of the passenger cabin 11-obj-2.

One embodiment is a system operative to autonomously alter functionality of an on-road vehicle. The system includes: an on-road vehicle 10 (FIG. 13A, FIG. 13B, FIG. 14A, FIG. 14B), operative to straddle over objects 11; a first object 11-obj-1 (FIG. 13A, FIG. 13B) operative to facilitate a first function when integrated with the on-road vehicle 10, in which the first object 11-obj-1 is currently integrated with the on-road vehicle 10 (as shown in FIG. 13A, FIG. 13B), thereby currently enabling the on-road vehicle 10 together with the first object 11-obj-1 to perform said first function; and a second object 11-obj-2 (FIG. 14A, FIG. 14B) operative to facilitate a second function when integrated with the on-road vehicle 10, in which the second object 11-obj-2 is currently located at a certain location (e.g., at location 20-*p* as shown in FIG. 2B, in which object 11-obj-2 is represented by the label 11).

In one embodiment, as a response to a specific request received in the system, the system is configured to autonomously alter functionality of the on-road vehicle 10 from a first functionality associated with the first function into a different functionality associated with the second function, in which as a part of said autonomous alteration and said response, the on-road vehicle is configured to: release autonomously the first object 11-obj-1; self drive from a current location of the on-road vehicle 10 to said certain location 20-*p* of the second object 11-obj-2; upon arrival to said certain location 20-*p*: straddle autonomously over the second object 11-obj-2 (e.g., as shown in FIG. 3A, FIG. 3B, in which object 11-obj-2 is represented by the label 11), thereby allowing the on-road vehicle 10 to grab and lift autonomously the second object 11-obj-2 above ground (e.g., as shown in FIG. 3C, FIG. 3D), thereby integrating autonomously the second object 11-obj-2 with the on-road vehicle 10; and perform said second function in conjunction with the second object 11-obj-2 now integrated with the on-road 10 vehicle (as shown in FIG. 14A, 14B).

In one embodiment, the first object 11-obj-1 is essentially a first type of container having a surface with a first type of interface 11-drawer (FIG. 13A, FIG. 13B), in which the first type of interface is operative to facilitate a certain first way of interfacing with people; and the second object 11-obj-2 is essentially a second type of container having a surface with a second type of interface 11-door (FIG. 14A, FIG. 14B), in which the second type of interface is operative to facilitate a certain second way of interfacing with people.

In one embodiment, the first type of container 11-obj-1 is a container operative to contain packages in drawers 11-drawer; the first function is autonomous package delivery; the first type of interface is associated with at least one of the drawers 11-drawer getting opened (FIG. 13A, FIG. 13B); the first way of interfacing with people comprises people accessing the drawers 11-drawer and collecting a package delivered by the on-road vehicle 10; and the first function of autonomous package delivery is facilitated by said integration of the first object 11-obj-1 with the on-road vehicle 10, in which said integration enables the system to both: (i) facilitate said delivery by driving autonomously the on-road vehicle 10 with packages onboard, and (ii) facilitate said collection of the packages by people accessing the drawers 11-drawer.

In one embodiment, the second type of container 11-obj-2 is a container operative to accommodate passengers; the second function is an autonomous taxi service; the second type of interface is associated with a door 11-door (FIG. 14A, FIG. 14B) operative to allow the passengers getting into and out-of the second type of container 11-obj-2; the second way of interfacing with people comprises people opening and closing the door 11-door; and the second function of autonomous taxi service is facilitated by said integration autonomously of the second object 11-obj-2 with the on-road vehicle 10, in which said integration autonomously enables the system to both: (i) facilitate said taxi service by autonomously transporting the passengers by the on-road vehicle 10 and in conjunction with the second object 11-obj-2, and (ii) further facilitate said taxi service by said allowing the passengers to get into and out-of the second type of container 11-obj-2 using the door 11-door.

In one embodiment, said lifting autonomously of the second object 11-obj-2 above ground is done so as to position the door 11-door at a certain height above ground that is operative to allow said passengers getting into and out-of the second type of container 11-obj-2, in which said certain height is between 20 (twenty) centimeters and 70 (seventy) centimeters above ground.

In one embodiment, the second object 11-obj-2 is selected from a group consisting of: (i) a container operative to contain packages in drawers 11-drawer, in which the second function is autonomous package delivery, (ii) a container operative to accommodate passengers 30 (FIG. 5B), in which the second function is a taxi service, (iii) a container operative to contain a load, in which the second function is transporting loads, (iv) a power source such as battery (e.g., 11-func, FIG. 7B), a fuel cell, and a generator, in which the second function is charging the on-road vehicle 10 while on the move, (v) a mobile vending machine, in which the second function is selling goods at different locations, (vi) a tank, in which the second function is transporting substances such as liquids and compressed gas, (vii) transportable electronic communication equipment such as a radio access network (RAN), in which the second function is providing electronic communication services from different locations.

In one embodiment, the on-road vehicle 10 comprises: an upper horizontal structure 3*a*, 3*b*, 3*c* (FIG. 1A) elevated above ground by vertical structures 2*a*, 2*a'*, 2*b*, 2*b'*, 2*c*, 2*c'*, 2*d*, 2*d'* (FIG. 1A) mounted on at least four wheels 1*a*, 1*b*, 1*c*, 1*d* (FIG. 1A) touching ground 9-gound, so as to create a certain clearance 9-clr above ground for at least a first connector 5-cnct associated with the upper horizontal structure 3*b* and attached thereunder; a control sub-system 4, 6, 7, 8 comprising a processing unit 8 (FIG. 1D) and a plurality of sensors 4*a*, 4*b*, 4*c* (FIG. 1A) and actuators 6, 7 (FIG. 1D), in which the control sub-system is configured to generate, in real-time, a three-dimensional representation of surrounding environment using data collected by the plurality of sensors; and at least a first linear actuator 2'+2 (2' moving up and down relative to 2, i.e., 2*a*' moving relative to 2*a*, 2*b*' moving relative to 2*b*, 2*c*' moving relative to 2*c*, and 2*d*' moving relative to 2*d*, FIG. 1A) configured to control and set said certain clearance 9-clr of the first connector 5-cnct, by causing the first connector, or the entire upper horizontal structure 3*a*, 3*b*, 3*c* including the first connector, to move up or down relative to ground 9-gound. In one embodiment, the control sub-system 4, 6, 7, 8 is further configured to use said three-dimensional representation, said actuators 6, 7, and said processing unit 8 in conjunction with a set of public-road self-driving directives, to: (i) facilitate said self-driving (FIG. 2A, FIG. 2B) of the on-road vehicle 10, over public roads 20*a* (FIG. 2A), 20*b* (FIG. 2B) and alongside regular car traffic 21*a*, 21*b*, 21*c*, 21*d*, 21*e*, 21*f* (FIG. 2A, FIG. 2B, FIG. 2C), to said certain location 20-*p*, (ii) position the on-road autonomous vehicle 10 in front of the second object 11-obj-2 (11 in FIG. 2C, FIG. 3A), and (iii) facilitate said straddling of the on-road vehicle 10 over the second object 11-obj-2 (11 in FIG. 3B), such that said first connector 5-cnct is brought to a predetermined position 5-pos over the second object 11-obj-2 (11 in FIG. 3B); and the control sub-system 4, 6, 7, 8 is further configured to use the first linear actuator 2'+2 to: (i) facilitate said grabbing by lowering the first connector 5-cnct into mechanical contact with the second object 11-obj-2 (11 in FIG. 3C) thereby allowing the connector to connect to or otherwise grab the second object, and (ii) facilitate said lifting by lifting (FIG. 3D) the second object 11-obj-2 above ground into a position operative to self-transport the second object.

In one embodiment, said first liner actuator 2'+2 is a distributed linear actuator comprising several sub-actuators 2*a*', 2*a*', 2*b*, 2*b*', 2*c*, 2*c*', 2*d*, 2*d*' (FIG. 1A), in which each sub-actuator is associated with one of the wheels 1*a*, 1*b*, 1*c*, 1*d* (FIG. 1A), such that the entire upper horizontal structure 3*a*, 3*b*, 3*c* is operative to move up and down relative to the wheels 1*a*, 1*b*, 1*c*, 1*d* and ground 9-ground, in which the linear actuators 2'+2 are also operative to act as springs/mechanical dumpers for the wheels 1*a*, 1*b*, 1*c*, 1*d* relative to the upper horizontal structure 3*a*, 3*b*, 3*c*.

In one embodiment, said first liner actuator 2'+2 is embedded in the first connector 5-cnct, thereby causing only the connector to move up and down relative to ground 9-ground, and such that the upper horizontal structure 3*a*, 3*b*, 3*c* remains in place.

In one embodiment, said integration of the first object 11-obj-1 with the on-road vehicle 10 was previously achieved by the on-road vehicle by performing a previous autonomous maneuver as a response to a particular request received in the system, in which as part of the previous autonomous maneuver, the on-road vehicle 10 is configured to: self drive from a previous location of the on-road vehicle to a specific location at which the first object 11-obj-1 is located; upon arrival to said specific location: straddle autonomously over the first object 11-obj-1, thereby allowing the on-road vehicle 10 to grab and lift autonomously the first object above ground, thereby facilitating said integration of the first object 11-obj-1 with the on-road vehicle 10.

In one embodiment, as a part of said releasing autonomously of the first object 11-obj-1, the on-road vehicle 10 is configured to: (i) lower the first object, (ii) un-grab the first object and (iii) straddle off the first object.

In one embodiment, said autonomously altering of functionality is facilitated by a combination of different autonomous functions working in synchronization, in which said combination of different autonomous functions comprises: (i) said self-driving, thereby allowing the on-road vehicle 10 to autonomously access the second object 11-object-2, (ii) said straddling autonomously, thereby allowing the on-rod vehicle 10 to self-align with the second object 11-object-2, and (iii) said grabbing and lifting autonomously of the second object 11-object-2, thereby allowing the on-rod vehicle 10 to self-integrate with the second object, in which said autonomously altering of functionality is further facilitated by an ability of the on-road vehicle 10 to straddle over the respective objects 11-object-1, 11-object-2, and in which said autonomously altering of functionality comprises at least said alteration of functionality taking place without relying on external support such as support from people for driving, support from people for lifting and displacing/aligning loads, and support from external mechanical devices for lifting and displacing/aligning loads; and said autonomously altering of functionality is further facilitated by the on-road vehicle eclectically interfacing 5-int-1 with the respective objects, in which: said electrically interfacing is done in conjunction with said grabbing of the respective object; said electrically interfacing comprises at least one of: (i) supplying electrical power to the respective object, (ii) supplying communication services to the respective object, and (iii) supplying sensory information to the respective object, thereby allowing the respective object to better interact with people in conjunction with accomplishing the respective functionality; and said electrically interfacing 5-int-1 is a part of said integration.

In one embodiment, said autonomously altering of functionality comprises switching/changing/modifying autonomy mode by the on-road vehicle, from a first autonomy mode into a second autonomy mode, in which the first autonomy mode is operative to support a first automatic on-road behavior that facilitates the first function, and the second autonomy mode is operative to support a second and different automatic on-road behavior that facilitates the second function, in which said switching/changing of the autonomy mode is a part of said integration. In one embodiment, the first object 11-obj-1 is a container operative to contain packages in drawers 11-drawer; the first function is autonomous package delivery; and the first autonomy mode is a mode that automatically facilitates arriving with the packages to a vicinity of people and enabling the people to access the drawers 11-drawer and collect a package delivered by the on-road vehicle 10. In one embodiment, the second object 11-obj-2 is a container operative to accommodate passengers; the second function is an autonomous taxi service; and the second autonomy mode is a mode that facilitates said taxi service by autonomously transporting the passengers by the on-road vehicle 10, and autonomously allowing the passengers to get into and out-of the second type of container 11-obj-2 using a door 11-door.

Figure 15:
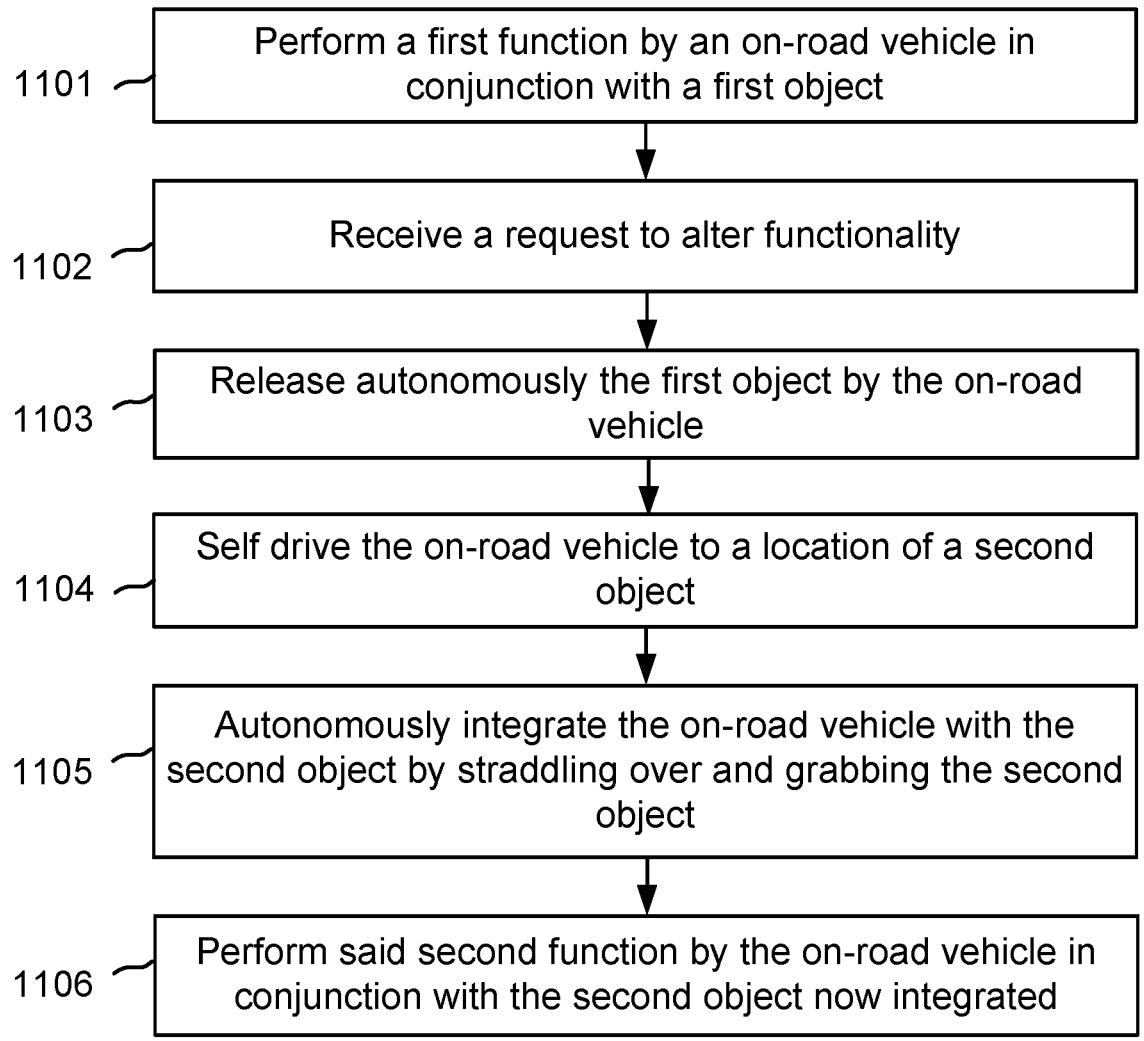
FIG. 15 illustrates one embodiment of a method for autonomously altering functionality of an on-road vehicle.

FIG. 15 illustrates one embodiment of a method for autonomously altering functionality of an on-road vehicle. The method includes: In step 1101, performing a first function by an on-road vehicle 10, in which the first function is performed by the on-road vehicle in conjunction with a first object 11-obj-1 that is currently integrated with the on-road-vehicle and that is operative to facilitate said first function. In step 1102, receiving, in conjunction with the on-road vehicle 10, a request associated with altering functionality of the on-road vehicle from a first functionality associated with the first function into a different functionality associated with a second function. In step 1103, releasing autonomously the first object 11-obj-1 by the on-road vehicle 10 as a response to said request. In step 1104, self driving by the on-road vehicle 10, as a further response to said request, from a current location of the on-road vehicle to a certain location at which a second object 11-obj-2 is located, in which the second object is associated with said different functionality. In step 1105, upon arrival to said certain location: (i) straddling autonomously, by the on-road vehicle 10, over the second object 11-obj-2, (ii) grabbing and lifting, autonomously, the second object 11-obj-2 above ground by the on-road vehicle 10, and thereby autonomously integrating the second object 11-obj-2 with the on-road vehicle 10. In step 1106, performing said second function by the on-road vehicle in conjunction with the second object 11-obj-2 now integrated with the on-road vehicle 10.

In one embodiment, the method further comprises: receiving, in conjunction with the on-road vehicle 10, and prior to said performing of the first function, a prior request associated with altering functionality of the on-road vehicle into the first functionality associated with the first object 11-obj-1; self driving by the on-road vehicle 10, as a response to said prior request, from a previous location of the on-road vehicle to a particular location at which the first object 11-obj-1 is located; and upon arrival to said particular location: (i) straddling autonomously, by the on-road vehicle 10, over the first object 11-obj-1, (ii) grabbing and lifting, autonomously, the first object 11-obj-1 above ground by the on-road vehicle 10, thereby facilitating said integration of the first object 11-obj-1 with the on-road vehicle 10 and said performing of the first function by the on-road vehicle 10.

In one embodiment, said releasing autonomously of the first object 11-obj-1 by the on-road vehicle 10 comprises: lowering the first object 11-obj-1 by the on-road vehicle 10; un-grabbing the first object 11-obj-1 by the on-road vehicle 10; and straddling off the first object 11-obj-1 by the on-road vehicle 10.

One embodiment is a system operative to respond to a dynamic demand for various functions by autonomously altering shape and functionality of on-road vehicles. The system includes: a fleet of on-road vehicles comprising a plurality of on-road vehicles such as vehicle 10, in which each of the on-road vehicles 10 is configured to autonomously-upon-demand pick-up and integrate-with various objects 11-obj-1, 11-obj-2; and a pool of objects 11-obj-1, 11-obj-2 comprising said various objects, in which each of the objects is associated with a respective functionality, thereby collectively supporting a variety of functionalities, and in which there are more objects 11-obj-1, 11-obj-2 in the pool than on-road vehicles 10 in the system.

In one embodiment, the system is configured to: determine current demands for various functionalities; determine, based on said current demands, a new assignment of functionalities for at least some of the on-road vehicles 10, in which said new assignment is expected to allow the fleet of on-road vehicles to better respond to the demands; and per each of the on-road vehicles 10 for which a new assignment of functionality was determined, the on road vehicle 10 is configured to: (i) release one of the objects 11-obj-1 that is currently integrated therewith, (ii) self drive from a current location of the on-road vehicle 10 to a location of parking of another one of the objects 11-obj-2 that is associated with the respective functionality newly assigned, and (iii) upon arrival to the location of parking: straddle autonomously over the another object 11-obj-2, thereby allowing the on-road vehicle 10 to grab and lift autonomously said another object 11-obj-2 above ground, and thereby integrating autonomously the another object 11-obj-2 with the on-road vehicle 10, thus embedding in the on-road vehicle 10 the respective functionality newly assigned.

In one embodiment, per each of the on-road vehicles 10 for which a new assignment of functionality was determined: said integrating autonomously of the respective another object 11-obj-2 with the on-road vehicle 10 results in an alteration of an outer shape of the on-road vehicle 10 from a previous outer shape associated with the respective previously integrated object 11-obj-1 into a new outer shape associated with the respective newly integrated object 11-obj-2.

In one embodiment, said alteration of the outer shape facilitates said new functionality assigned.

In one embodiment, said previous outer shape is associated with a first outer interface (e.g., 11-drawer) in the previously integrated object 11-obj-1, in which said first outer interface is associated with a first way of interacting with people; and said new outer shape is associated with a second outer interface (e.g., 11-door) in the newly integrated object 11-obj-2, in which said second outer interface is associated with a second way of interacting with people.

Figure 16:
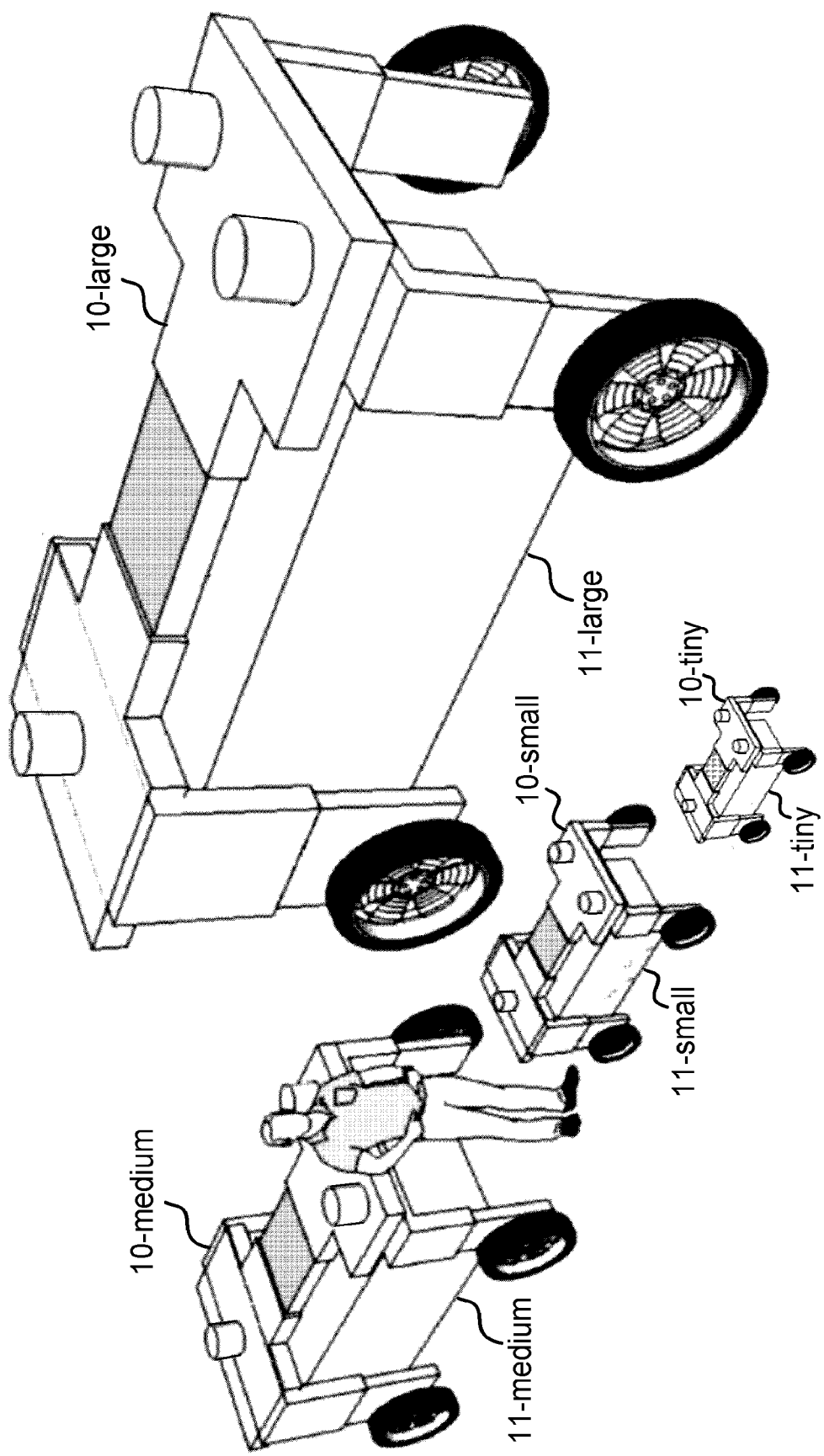
FIG. 16 illustrates several embodiments of on-road autonomous vehicles having several different sizes respectively.

FIG. 16 illustrates several embodiments of on-road autonomous vehicles having several different sizes respectively. A large on-road autonomous vehicle 10-large is operative to straddle over and pick up large-sized containers/loads 11-large, in which large-sized containers are containers having at least one dimension (e.g., length) that is longer than 2 (two) meters, and in which such containers are operative to be used in conjunction with various functions, such as transporting passengers and transporting/delivering packages. A medium on-road autonomous vehicle 10-medium is operative to straddle over and pick up medium-sized containers/loads 11-medium, in which medium-sized containers are containers having at least one dimension between 1 (one) meter and 2 (two) meters, and in which such containers are operative to be used in conjunction with various functions, such as transporting/delivering groceries and packages. A small on-road autonomous vehicle 10-small is operative to straddle over and pick up small-sized containers/loads 11-small, in which small-sized containers are containers having at least one dimension between 50 (fifty) centimeters and 1 (one) meter, and in which such containers are operative to be used in conjunction with various functions, such as transporting/delivering packages and delivering food. In one embodiment, the small load 11-small is, by itself, a package being delivered by the small on-road autonomous vehicle 10-small. A tiny on-road autonomous vehicle 10-tiny is operative to straddle over and pick up tiny containers/loads 11-tiny, in which tiny containers are containers having at least one dimension between 20 (twenty) centimeters and 50 (fifty) centimeters, and in which such containers are operative to be used in conjunction with various functions, such as transporting/delivering packages, documents, and medicine. In one embodiment, the tiny load 11-tiny is, by itself, a package being delivered by the small on-road autonomous vehicle 10-small.

In this description, numerous specific details are set forth. However, the embodiments/cases of the invention may be practiced without some of these specific details. In other instances, well-known hardware, materials, structures and techniques have not been shown in detail in order not to obscure the understanding of this description. In this description, references to "one embodiment" and "one case" mean that the feature being referred to may be included in at least one embodiment/case of the invention. Moreover, separate references to "one embodiment", "some embodiments", "one case", or "some cases" in this description do not necessarily refer to the same embodiment/case. Illustrated embodiments/cases are not mutually exclusive, unless so stated and except as will be readily apparent to those of ordinary skill in the art. Thus, the invention may include any variety of combinations and/or integrations of the features of the embodiments/cases described herein. Also herein, flow diagrams illustrate non-limiting embodiment/case examples of the methods, and block diagrams illustrate non-limiting embodiment/case examples of the devices. Some operations in the flow diagrams may be described with reference to the embodiments/cases illustrated by the block diagrams. However, the methods of the flow diagrams could be performed by embodiments/cases of the invention other than those discussed with reference to the block diagrams, and embodiments/cases discussed with reference to the block diagrams could perform operations different from those discussed with reference to the flow diagrams. Moreover, although the flow diagrams may depict serial operations, certain embodiments/cases could perform certain operations in parallel and/or in different orders from those depicted. Moreover, the use of repeated reference numerals and/or letters in the text and/or drawings is for the purpose of simplicity and clarity and does not in itself dictate a relationship between the various embodiments/cases and/or configurations discussed. Furthermore, methods and mechanisms of the embodiments/cases will sometimes be described in singular form for clarity. However, some embodiments/cases may include multiple iterations of a method or multiple instantiations of a mechanism unless noted otherwise. For example, when a controller or an interface are disclosed in an embodiment/case, the scope of the embodiment/case is intended to also cover the use of multiple controllers or interfaces.

Certain features of the embodiments/cases, which may have been, for clarity, described in the context of separate embodiments/cases, may also be provided in various combinations in a single embodiment/case. Conversely, various features of the embodiments/cases, which may have been, for brevity, described in the context of a single embodiment/case, may also be provided separately or in any suitable sub-combination. The embodiments/cases are not limited in their applications to the details of the order or sequence of steps of operation of methods, or to details of implementation of devices, set in the description, drawings, or examples. In addition, individual blocks illustrated in the figures may be functional in nature and do not necessarily correspond to discrete hardware elements. While the methods disclosed herein have been described and shown with reference to particular steps performed in a particular order, it is understood that these steps may be combined, subdivided, or reordered to form an equivalent method without departing from the teachings of the embodiments/cases. Accordingly, unless specifically indicated herein, the order and grouping of the steps is not a limitation of the embodiments/cases. Embodiments/cases described in conjunction with specific examples are presented by way of example, and not limitation. Moreover, it is evident that many alternatives, modifications and variations will be apparent to those skilled in the art. Accordingly, it is intended to embrace all such alternatives, modifications and variations that fall within the spirit and scope of the appended claims and their equivalents.

What is claimed is:

1. A system operative to autonomously alter functionality of an on-road vehicle, comprising:
    an on-road vehicle operative to straddle over objects;
    a first type of container comprising a plurality of separate package compartments operative to facilitate autonomous package delivery when integrated with the on-road vehicle, in which the first type of container is currently integrated with the on-road vehicle, thereby currently enabling autonomous delivery of a plurality of packages inside the plurality of compartments, in which each of the compartments comprises a respective dedicated interface for loading/unloading packages; and
    a second type of container comparing a passenger door and operative to facilitate autonomous passenger transport when integrated with the on-road vehicle, in which the second type of container is currently located at a certain location;
    wherein, as a response to a specific request received in the system, the system is configured to autonomously alter functionality of the on-road vehicle from package delivery into passenger transport, in which as a part of said autonomous alteration and said response, the on-road vehicle is configured to:
    release autonomously the first type of container;
    self drive from a current location of the on-road vehicle to said certain location of the second type of container;
    upon arrival to said certain location: straddle autonomously over the second type of container, thereby allowing the on-road vehicle to grab and lift autonomously the second type of container above ground, thereby integrating autonomously the second type of container and the passenger door with the on-road vehicle; and
    perform said passenger transport in conjunction with the second type of container and the passenger door that are now integrated with the on-road vehicle, in which the passenger door is configured to act as an interface allowing passengers into and out-of the second type of container.

2. The system of claim 1, wherein said lifting autonomously of the second object above ground is done so as to position the passenger door at a certain height above ground that is operative to allow passengers getting into and out-of the second type of container, in which said certain height is between 20 (twenty) centimeters and 70 (seventy) centimeters above ground.

3. The system of claim 1, wherein said integration of the first type of container with the on-road vehicle was previously achieved by the on-road vehicle by performing a previous autonomous maneuver as a response to a particular request received in the system, in which as part of the previous autonomous maneuver, the on-road vehicle is configured to:
    self drive from a previous location of the on-road vehicle to a specific location at which the first type of container is located;
    upon arrival to said specific location: straddle autonomously over the first type of container, thereby allowing the on-road vehicle to grab and lift autonomously the first type of container above ground, thereby facilitating said integration of the first type of container with the on-road vehicle.

4. The system of claim 3, wherein as a part of said releasing autonomously of the first type of container, the on-road vehicle is configured to: (i) lower the first type of container, (ii) un-grab the first type of container and (iii) straddle off the first type of container.

5. The system of claim 1, wherein:
    said autonomously altering of functionality is facilitated by a combination of different autonomous functions working in synchronization, in which said combination of different autonomous functions comprises: (i) said self-driving, thereby allowing the on-road vehicle to autonomously access the second type of container, (ii) said straddling autonomously, thereby allowing the on-rod vehicle to self-align with the second type of container, and (iii) said grabbing and lifting autonomously of the second type of container, thereby allowing the on-rod vehicle to self-integrate with the second type of container, in which said autonomously altering of functionality is further facilitated by an ability of the on-road vehicle to straddle over the respective types of containers, and in which said autonomously altering of functionality comprises at least said alteration of functionality taking place without relying on external support such as support from people for driving, support from people for lifting and displacing/aligning loads, and support from external mechanical devices for lifting and displacing/aligning loads;

said autonomously altering of functionality is further facilitated by the on-road vehicle eclectically interfacing with the respective types of containers, in which: said electrically interfacing is done in conjunction with said grabbing of the respective type of container; said electrically interfacing comprises at least one of: (i) supplying electrical power to the respective type of container, (ii) supplying communication services to the respective type of container, and (iii) supplying sensory information to the respective type of container, thereby allowing the respective type of container to better interact with people in conjunction with accomplishing the respective functionality; and said electrically interfacing is a part of said integration.

6. The system of claim 5, wherein said autonomously altering of functionality comprises switching/changing/modifying autonomy mode by the on-road vehicle, from a first autonomy mode into a second autonomy mode, in which the first autonomy mode is operative to support a first automatic on-road behavior that facilitates package delivery, and the second autonomy mode is operative to support a second and different automatic on-road behavior that facilitates passenger transport, in which said switching/changing of the autonomy mode is a part of said integration.

7. A method for autonomously altering functionality of an on-road vehicle, comprising:

facilitating autonomous package delivery by an on-road vehicle in conjunction with a first type of container comprising a plurality of package compartments that is currently integrated with the on-road-vehicle and that is operative to facilitate delivery of a plurality of packages inside the plurality of package compartments;

receiving, in conjunction with the on-road vehicle, a request associated with altering functionality of the on-road vehicle from autonomous package delivery into autonomous passenger transport;

releasing autonomously the first type of container by the on-road vehicle as a response to said request;

self driving by the on-road vehicle, as a further response to said request, from a current location of the on-road vehicle to a certain location at which a second type of container is located, in which the second type of container comprises a passenger door;

upon arrival to said certain location: (i) straddling autonomously, by the on-road vehicle, over the second type of container, (ii) grabbing and lifting, autonomously, the second type of container above ground by the on-road vehicle, and thereby autonomously integrating the second type of container and the passenger door with the on-road vehicle; and facilitating passenger transport by the on-road vehicle in conjunction with the second type of container and the passenger door that are now integrated with the on-road vehicle.

8. The method of claim 7, further comprising:

receiving, in conjunction with the on-road vehicle, and prior to said facilitating autonomous package delivery, a prior request associated with altering functionality of the on-road vehicle into autonomous package delivery;

self driving by the on-road vehicle, as a response to said prior request, from a previous location of the on-road vehicle to a particular location at which the first type of container is located; and upon arrival to said particular location: (i) straddling autonomously, by the on-road vehicle, over the first type of container, (ii) grabbing and lifting, autonomously, the first type of container above ground by the on-road vehicle, thereby facilitating said integration of the first type of container with the on-road vehicle and thereby facilitating autonomous package delivery by the on-road vehicle.

9. The method of claim 8, wherein said releasing autonomously of the first type of container by the on-road vehicle comprises:

lowering the first type of container by the on-road vehicle;
un-grabbing the first type of container by the on-road vehicle; and
straddling off the first type of container by the on-road vehicle.

10. A system operative to respond to a dynamic demand for various functions by autonomously altering shape and functionality of on-road vehicles, comprising:

a fleet of on-road vehicles comprising a plurality of on-road vehicles, in which each of the on-road vehicles is configured to autonomously-upon-demand pick-up and integrate-with each one of various types of containers; and a pool of the various types of containers, in which at least some of the containers are of first type that comprises a plurality of package compartments, and at least some of the containers are of a second type that comprises a passenger door;

wherein the system is configured to:

determine current demands for various functionalities;

determine, based on said current demands, a new assignment of functionalities for at least some of the on-road vehicles, in which said new assignment is expected to allow the fleet of on-road vehicles to better respond to the demands; and per each of at least some of the on-road vehicles for which the new assignment of functionality was determined to be passenger transport, the respective on road vehicle is configured to: (i) release the first type of container that is currently integrated therewith, (ii) self drive from a current location of the on-road vehicle to a location of parking of one of the containers of the second type associated with passenger transport, and (iii) upon arrival to the location of parking: straddle autonomously over the container of the second type, thereby allowing the on-road vehicle to grab and lift autonomously said container of the second type above ground, and thereby integrating autonomously the container of the second type and the respective door with the on-road vehicle, thus altering respective functionality from package delivery into passenger transport.

11. The system of claim 10, wherein, per each of the on-road vehicles for which a new assignment of functionality was determined: said integrating autonomously of the respective type of container with the on-road vehicle results in an alteration of an outer shape of the on-road vehicle from a previous outer shape associated with the respective previously integrated type of container into a new outer shape associated with the respective newly integrated type of container.

12. The system of claim 11, wherein said alteration of the outer shape facilitates said new functionality assigned.

13. The system of claim 12, wherein:
- said previous outer shape is associated with a first outer interface in the previously integrated type of container, in which said first outer interface is associated with a first way of interacting with people; and
- said new outer shape is associated with a second outer interface in the newly integrated type of container, in which said second outer interface is associated with a second way of interacting with people.

\* \* \* \* \*